(12) United States Patent
Tucker et al.

(10) Patent No.: US 11,891,214 B2
(45) Date of Patent: Feb. 6, 2024

(54) FILMS AND BAGS HAVING GRADIENT DEFORMATION PATTERNS

(71) Applicant: THE GLAD PRODUCTS COMPANY, Oakland, CA (US)

(72) Inventors: Edward B Tucker, Willowbrook, IL (US); Robert T Dorsey, Willowbrook, IL (US); Ranyi Zhu, Willowbrook, IL (US); Theodore Cory Fites, Pleasanton, CA (US); Zeljko Vidovic, Willowbrook, IL (US); Michael G Borchardt, Willowbrook, IL (US); Jason R Maxwell, Willowbrook, IL (US); Shaun T Broering, Fort Thomas, KY (US); Daniel C Peck, West Chester, OH (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 17/625,008

(22) PCT Filed: Jul. 13, 2020

(86) PCT No.: PCT/US2020/041826
§ 371 (c)(1),
(2) Date: Jan. 5, 2022

(87) PCT Pub. No.: WO2021/011483
PCT Pub. Date: Jan. 21, 2021

(65) Prior Publication Data
US 2022/0204217 A1 Jun. 30, 2022

Related U.S. Application Data

(60) Provisional application No. 62/875,633, filed on Jul. 18, 2019.

(51) Int. Cl.
*B65D 33/02* (2006.01)
*B29C 59/02* (2006.01)
(Continued)

(52) U.S. Cl.
CPC ............ *B65D 33/02* (2013.01); *B29C 59/022* (2013.01); *B29C 59/04* (2013.01); *B32B 1/00* (2013.01);
(Continued)

(58) Field of Classification Search
CPC ........ B29C 59/022; B29C 59/04; B65D 33/02
See application file for complete search history.

(56) References Cited

U.S. PATENT DOCUMENTS 4,859,519 A * 8/1989 Cabe, Jr. ............ A61F 13/51121
425/290
6,150,647 A * 11/2000 Anderson .......... B65D 81/3461
428/152

(Continued)

FOREIGN PATENT DOCUMENTS

CN 208558471 U 3/2019
KR 10-2005-0018460 A 2/2005

(Continued)

OTHER PUBLICATIONS

Office Action as received in Korean application 10-2022-7001643 dated Jun. 2, 2022.

(Continued)

*Primary Examiner* — Derek J Battisti
(74) *Attorney, Agent, or Firm* — Keller Preece PLLC

(57) ABSTRACT

Thermoplastic films and bags include gradient patterns of post-formation deformations. The gradient patterns of post-formation deformations can provide a connotation of strength. Additionally, the gradient pattern of post-formation deformations can provide different areas of the films or bags (Continued)

with different physical characteristics such as tear resistance, puncture resistance, elasticity, etc.

20 Claims, 28 Drawing Sheets

(51) Int. Cl.
    *B29C 59/04*     (2006.01)
    *B32B 1/00*     (2006.01)
    *B32B 3/30*     (2006.01)
    *B32B 7/14*     (2006.01)
    *B32B 27/08*     (2006.01)
    *B65D 33/28*     (2006.01)
    *B65F 1/00*     (2006.01)
    *B29K 101/12*     (2006.01)
    *B29L 31/00*     (2006.01)

(52) U.S. Cl.
    CPC ............... *B32B 3/30* (2013.01); *B32B 7/14* (2013.01); *B32B 27/08* (2013.01); *B65D 33/28* (2013.01); *B65F 1/0006* (2013.01); *B29K 2101/12* (2013.01); *B29L 2031/7129* (2013.01); *B32B 2439/06* (2013.01)

(56) References Cited

U.S. PATENT DOCUMENTS

| | | | | |
|---|---|---|---|---|
| 6,394,651 | B2 * | 5/2002 | Jackson | B65D 31/02 383/77 |
| 6,394,652 | B2 * | 5/2002 | Meyer | B65D 31/02 206/390 |
| 7,687,134 | B2 * | 3/2010 | Withers | B29D 7/01 428/167 |
| 8,876,382 | B2 * | 11/2014 | Wilcoxen | B65D 33/004 383/119 |
| 9,546,277 | B2 * | 1/2017 | Cobler | B65D 65/38 |
| D850,283 | S * | 6/2019 | Cobler | D9/703 |
| D850,926 | S * | 6/2019 | Cobler | D9/703 |
| 2006/0025739 | A1 | 2/2006 | DiPalma et al. | |
| 2011/0044566 | A1 | 2/2011 | Fish et al. | |
| 2012/0134606 | A1 * | 5/2012 | Borchardt | B65D 33/28 156/196 |
| 2017/0113872 | A1 * | 4/2017 | Cobler | B29C 59/04 |

FOREIGN PATENT DOCUMENTS

| | | |
|---|---|---|
| KR | 2008-0082853 A | 9/2008 |
| KR | 10-1273272 B1 | 6/2013 |
| WO | WO 2011/060405 A1 | 5/2011 |
| WO | WO 2019/094299 A1 | 5/2019 |

OTHER PUBLICATIONS

Application No. PCT/US2020/041826 International Search Report dated Oct. 7, 2020.
Application No. PCT/US2020/041826 Written Opinion of the International Searching Authority dated Oct. 7, 2020.
Examination Report as received in Australian application 2020313911 dated Mar. 24, 2022.
Office Action as received in Chinese application 202080051806.7 dated Apr. 13, 2022 [No. English translation available].
Notice of Acceptance as received in Australian application 2020313911 dated Jul. 22, 2022.

* cited by examiner

FILMS AND BAGS HAVING GRADIENT DEFORMATION PATTERNS

CROSS-REFERENCE

This application claims the benefit of and priority to U.S. Provisional Application No. 62/875,633, filed on Jul. 18, 2019. The disclosure is herein incorporated by reference in its entirety.

BACKGROUND

1. Technical Field

The present application relates generally to thermoplastic films and structures formed therefrom. More particularly, the present invention relates to thermoplastic films and bags having gradient patterns.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films or stretch the thermoplastic films, thereby increasing surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching.

Unfortunately, stretched or otherwise thinned thermoplastic films can have undesirable properties. For example, thinner thermoplastic films are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films. As such, manufacturers may be dissuaded to stretch a film or use thinner films despite the potential material savings.

Accordingly, there are a number of considerations to be made in thermoplastic films and manufacturing methods.

BRIEF SUMMARY

One or more implementations of the present disclosure solve one or more problems in the art with thermoplastic films and/or bags including gradient deformation patterns. For example, in one or more implementations, a thermoplastic film includes a plurality of deformations arranged in shapes or repeat units arranged in a gradient pattern. The gradient deformation pattern can provide a reinforced appearance to the thermoplastic film. By imparting a reinforced appearance to the thermoplastic film, one or more implementations described herein make the thermoplastic film appear thicker or stronger. This reinforced appearance can cause consumers to feel they are receiving a thicker product even though they are purchasing products with thinner films.

Furthermore, the deformations can provide the thermoplastic film with increased elasticity or strength. The gradient pattern or arrangement of the deformations can provide the film with elasticity or strength that increases or decreases in one or more directions along the thermoplastic film. For instance, in a bag implementation, a gradient pattern of deformations that increase in size from the bottom of the bag to the top of the bag can provide the top of the bag with increased elasticity that can allow the bag to be overstuffed or to allow the bag to be stretched around a waste container. Thus, the gradient pattern of deformations can provide both visual and physical benefits.

Moreover, an implementation of a thermoplastic film comprising post-formation deformations includes a plurality of first deformations comprising a first deformation repeat unit comprising a first shape and a first size; a plurality of second deformations comprising a second deformation repeat unit comprising the first shape and a second size, the second size being smaller than the first size; and a plurality of third deformations comprising a third deformation repeat unit comprising the first shape and a third size, the third size being smaller than the second size. Furthermore, the first deformations, the second deformations, and the third deformations are arranged in the thermoplastic film such that the first, second, and third deformation repeat units form a gradient pattern.

Additionally, an implementation of a thermoplastic bag comprising post-formation deformations includes a first sidewall and a second sidewall joined together along a first side edge, a second side edge, and a bottom edge. The thermoplastic bag further includes an opening opposite the bottom edge. The first and second sidewalls include a plurality of deformations formed in the first sidewall and the second sidewall. The plurality of deformations comprise deformation repeat units that are arranged in a gradient pattern such that the size of the deformation repeat units of protrusions are one or more of progressively larger or progressively smaller along a length of the thermoplastic bag.

In addition to the foregoing, an implementation of a method of making a thermoplastic film with post-formation deformations involves forming a plurality of deformations in a thermoplastic film that comprise deformation repeat units that are arranged in a gradient pattern such that the size of the deformation repeat units of protrusions are one or more of progressively larger or progressively smaller along a length of the thermoplastic film by passing the thermoplastic film between a first intermeshing roller and a second intermeshing roller. The first intermeshing roller comprise repeat units of protrusions arranged in the gradient pattern such that the size of the repeat units of protrusions are one or more of progressively larger or progressively smaller along a length of the first intermeshing roller. The method further involves forming the thermoplastic film with the plurality of deformations into the thermoplastic bag.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which.

DETAILED DESCRIPTION

Figure 1C:
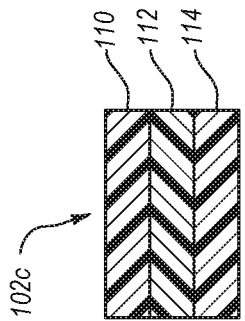
FIG. 1A-1C show partial side cross-sectional views of thermoplastic films having varying numbers of sublayers according to one or more implementations of the present disclosure.

One or more implementations of the present invention include single or multi-layered thermoplastic films with deformations arranged in gradient patterns. For example, in one or more implementations, a thermoplastic film includes a plurality of deformations arranged in shapes or repeat units arranged in a gradient pattern. In particular, the plurality of deformations can comprise deformation repeat units that are one or more of progressively larger or progressively smaller along one or more directions of the thermoplastic film. For instance, the deformation repeat units can be progressively larger or progressively smaller along the length and/or width of the thermoplastic film.

As used herein a deformation comprises a structure formed into a thermoplastic film. In one or more implementations, a "deformation" refers to a change, distortion, thinning, or stretching of a thermoplastic film. For example, with regard to SELF'ing described below, a deformation can be a raised rib-like element extending in the Z-direction formed by SELF'ing intermeshing rollers. Still further, with regard to ring rolling, a deformation can be a thick rib defined by thinner stretched webs. In another example, with regard to embossing described below, a deformation can be an engraved formation created by embossing rollers. A post-formation deformation is a deformation formed into a film after the film is formed, in contrast to formation deformations, such as extruded ribs, that are formed during formation of the film.

As used herein a deformation repeat unit can comprise a grouping of deformations that form a shape or set of shapes that repeat in a pattern. For example, a deformation repeat unit can comprise a plurality for deformations that form a hexagon, diamond, circle, or other shape. In still further implementations, a deformation repeat unit can comprise a first grouping of deformations that form a first shape and a second grouping of deformations that form a second shape.

As mentioned before, the plurality of deformations can comprise deformation repeat units that are one or more of progressively larger or progressively smaller along one or more directions of the thermoplastic film. For instance, the deformation repeat units comprise a plurality of different sizes that are ordered across one or more directions of the film by size. For example, the deformation repeat units can start small at the bottom of the film and increase in size along the height of the film.

As described in greater detail below, one or more implementations involve forming the deformations into a film using one or more of structural elastic like film (SELF) processes, ring rolling, or embossing. The arrangement of the patterns of deformations provide a gradient pattern mentioned above. In addition to providing a gradient pattern, the deformations can provide increased film properties (tear resistance, elasticity, etc.). Still further the deformations can provide texture and/or increased loft/gauge, which can connote or provide strength to the film.

As discussed above, the structures of one or more implementations can comprise multiple thermoplastic films (e.g., two or more) that are non-continuously laminated together. One or more implementations can involve laminating the layers of the non-continuously laminated structure of thermoplastic films using the same process to form the deformations in a single step (e.g., via ring rolling, a structural elastic like film process, or embossing). In alternative implementations, the layers can be bonded via adhesives, ultrasonic bonding, or other techniques.

The non-continuous bonding can enhance the strength and other properties of the thermoplastic films exhibiting gradient pattern of deformations. In particular, one or more implementations provide for forming bonds between adjacent films of a non-continuously laminated structure that are relatively light such that forces acting on the non-continuously laminated structure are first absorbed by breaking the bonds rather than, or prior to, tearing or otherwise causing the failure of the films of the non-continuously laminated structure. Such implementations can provide an overall thinner structure employing a reduced amount of raw material that nonetheless has maintained or increased strength parameters. Alternatively, such implementations can use a given amount of raw material and provide a structure with increased strength parameters.

In particular, the light bonds or bond regions of adjacent films of non-continuously laminated structures in accordance with one or more implementations can act to first absorb forces via breaking of the bonds prior to allowing that same force to cause failure of the individual films of the non-continuously laminated structure of thermoplastic films. Such action can provide increased strength to the non-continuously laminated structure of thermoplastic films. In one or more implementations, the light bonds or bond regions include a bond strength that is advantageously less than a weakest tear resistance of each of the individual films so as to cause the bonds to fail prior to failing of the films. Indeed, one or more implementations include bonds that the release just prior to any localized tearing of the layers of the non-continuously laminated structure of thermoplastic films.

Thus, in one or more implementations, the light bonds or bond regions of a non-continuously laminated structure of thermoplastic films can fail before either of the individual layers undergoes molecular-level deformation. For example, an applied strain can pull the light bonds or bond regions apart prior to any molecular-level deformation (stretching, tearing, puncturing, etc.) of the individual films. In other words, the light bonds or bond regions can provide less resistive force to an applied strain than molecular-level deformation of any of the layers of the non-continuously laminated structure of thermoplastic films. The inventors have surprisingly found that such a configuration of light bonding can provide increased strength properties to the non-continuously laminated structure of thermoplastic films as compared to a monolayer film of equal thickness or a non-continuously laminated structure in which the plurality of films are tightly bonded together or continuously bonded (e.g., coextruded).

One or more implementations provide for tailoring the bonds or bond regions between layers of a non-continuously laminated structure of thermoplastic films to ensure light bonding and associated increased strength. For example, one or more implementations include modifying or tailoring one or more of a bond strength, bond density, bond pattern, or bond size between adjacent layers of a non-continuously laminated structure of thermoplastic films to deliver a structure with strength characteristics better than or equal to the sum of the strength characteristics of the individual films. Such bond tailoring can allow for non-continuously laminated structure of thermoplastic films at a lower basis weight (amount of raw material) to perform the same as or better than higher basis weight mono-layer or co-extruded films. The bonds can be tailored such that they fail when subjected to forces and conditions consistent with normal use of a product incorporating the non-continuously laminated structure of thermoplastic films. For example, when the non-continuously laminated structure of thermoplastic films is formed into a garbage bag, the bonds between the layers of the non-continuously laminated structure can be tailored to fail when subjected to forces consistent with objects being placed into the garbage bag, consistent with the garbage bag being removed from a container (e.g., garbage can), or consistent with the garbage bag being carried from one location to another location.

As used herein, the terms "lamination," "laminate," and "laminated film," refer to the process and resulting product made by bonding together two or more layers of film or other material. The term "bonding", when used in reference to bonding of multiple films of a non-continuously laminated structure of thermoplastic films, may be used interchangeably with "lamination" of the layers. According to methods of one or more implementations of the present invention, adjacent films of a non-continuously laminated structure of thermoplastic films are laminated or bonded to one another. The bonding purposely results in a relatively weak bond between the layers that has a bond strength that is less than the strength of the weakest layer of the structure. This allows the lamination bonds to fail before the layer, and thus the structure, fails.

As a verb, "laminate" means to affix or adhere (by means of, for example, adhesive bonding, pressure bonding, ultrasonic bonding, corona lamination, heat lamination, and the like) two or more separately made film articles to one another so as to form a multi-layer structure. As a noun, "laminate" means a product produced by the affixing or adhering just described.

In one or more implementations, the light lamination or bonding between films of a non-continuously laminated structure of thermoplastic films may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction, the transverse direction or both. Both partially discontinuous and discontinuous are types of non-continuous bonding (i.e., bonding that is not complete and continuous between two surfaces).

In addition to non-continuous bonding, one or more implementations include incrementally stretching one or more films exhibiting a three-dimensional effect. For example, one or more implementations includes incrementally stretching a film using MD ring rolling, TD ring rolling, diagonal direction ring rolling, the formation of strainable networks, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more implementations involve stretching processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

Relatively weak bonding and stretching can be accomplished simultaneously through one or more suitable techniques. For example, bonding and stretching may be achieved by pressure (for example MD ring rolling, TD ring rolling, helical or DD ring rolling, strainable network lamination, or embossing), or with a combination of heat and pressure. Alternately, a manufacturer can first stretch the films and then bond the films using one or more bonding techniques. For example, one or more implementations can include ultrasonic bonding to lightly laminate the films. Alternately or additionally, adhesives can laminate the films. Treatment with a Corona discharge can enhance any of the above methods. In one or more implementations, the contacting surfaces/layers can comprise a tacky material to facilitate lamination. Prior to lamination, the separate films can be film or can be subject to separate processes, such as stretching, slitting, coating and printing, and corona treatment.

In addition to the foregoing, one or more implementations provide for forming a thermoplastic film having a gradient pattern of deformations into a bag. By forming a bag out of a thermoplastic film with a gradient pattern of deformations, the one or more implementations can give the impression to consumers of a thicker bag. As mentioned above, consumers often associate thicker bags with greater value, even though thicker bags may not exhibit greater performance qualities over thinner bags.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable (e.g., polyhydroxybutyrate and polylactic acid) or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a gradient pattern of deformations to provide the benefits of the present disclosure.

For example, in one implementation, thermoplastic film layers of a multi-layer film may include different colors. In such an implementation, when provided with a gradient pattern including raised rib-like elements with different pattern densities or depths of engagement, the colors of the multi-layer film plies enhance the effect of the deformation pattern. For instance, the colors of the multi-layer film plies enhance the effect of the deformation pattern by creating more visual contrast.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
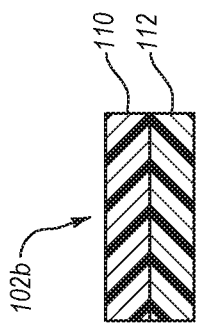
Figure 1A:
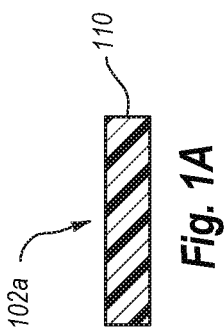

Films having a gradient pattern of deformations can may include a single film formed from one, two, three, or more layers of thermoplastic material. FIGS. 1A-1C are partial cross-sectional views of multi-layer films into which a gradient pattern of deformations can be formed. Such films can then be used to form products, such as a thermoplastic bag. In some implementations, the film may include a single layer film 102a, as shown in FIG. 1A, comprising a single layer 110. In other implementations, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, the film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

As mentioned above, one or more implementations include a thermoplastic film with a gradient pattern of deformations. The deformations that make up a gradient pattern of deformations may be formed or manufactured in various ways. For example, the gradient pattern of deformations may be formed by way of cold deformation processing. In one or more implementations, cold deformation processing can include one or more of SELF'ing, ring rolling, or embossing, each of which is described in greater detail below.

Figure 2:
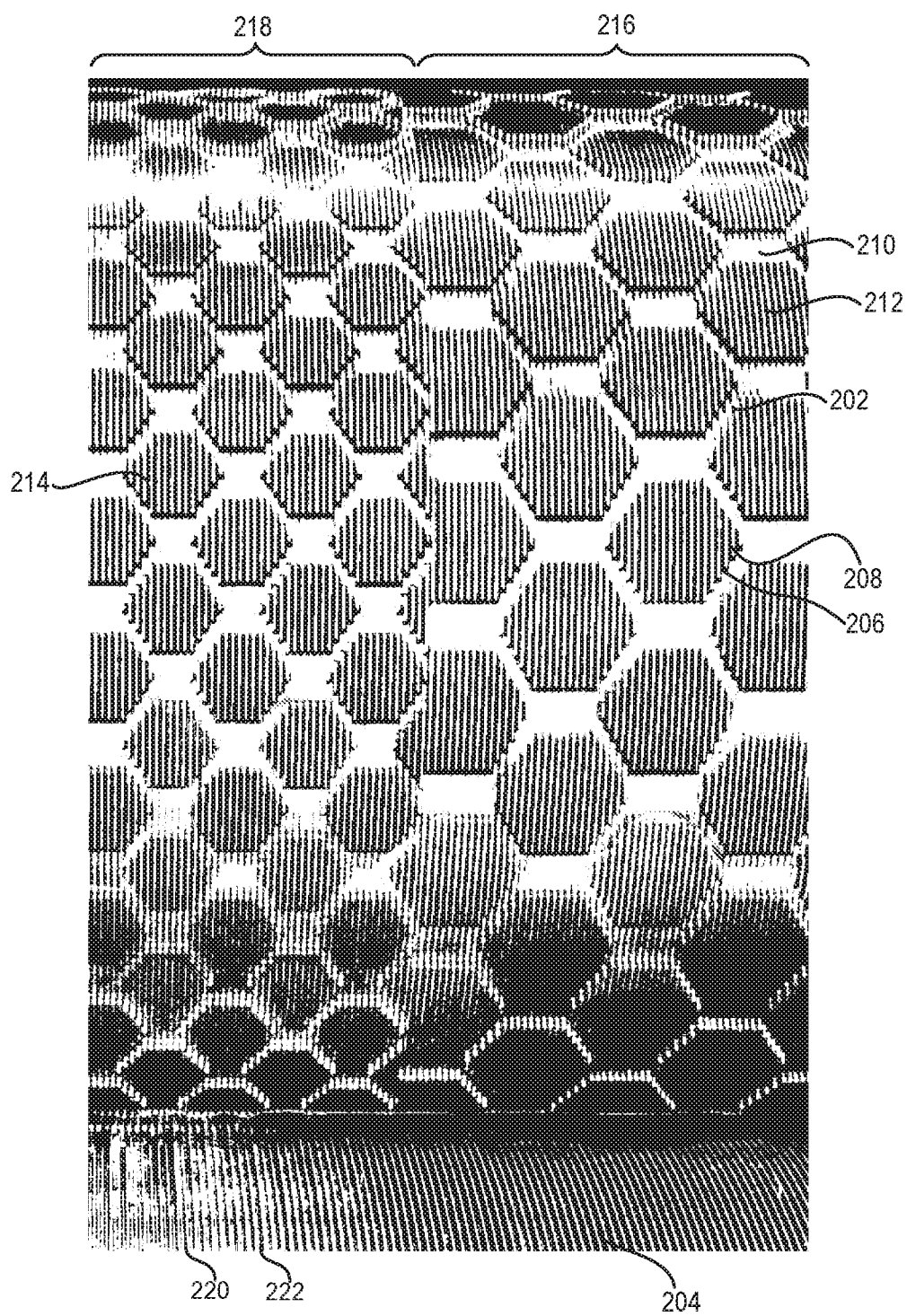
FIG. 2 shows a perspective view of a pair of structural elastic like film (SELF) rollers utilized to form patterns of deformations (e.g., raised rib-like elements) in films according to one or more implementations of the present disclosure.

FIG. 2 shows a pair of SELF'ing intermeshing rollers 202, 204 (e.g., a portion of a first SELF'ing intermeshing roller 202 and a portion of a second SELF'ing intermeshing roller 204) for creating strainable networks (e.g., SELFing deformations) in a gradient pattern. As shown in FIG. 2, the first SELF'ing intermeshing roller 202 may include a plurality of ridges 206 and grooves 208 extending generally radially outward in a direction orthogonal to an axis of rotation. As shown in FIG. 2, in some implementations, the ridges 206 of the first SELF'ing intermeshing roller 202 may include a plurality of notches 210 that break up the ridges 206 and grooves 208 in repeat units of ridges 212, 214.

As shown the first SELF'ing intermeshing roller 202 can comprise repeat units of ridges 212, 214 of differing sizes. Furthermore, the repeat units of ridges 212, 214 are progressively larger or progressively smaller along a length of the first SELF'ing intermeshing roller 202 so as to form a gradient pattern. In particular, the first SELF'ing intermeshing roller 202 includes a first section 216 that includes hexagon-shaped repeat units of ridges 212 of a first size. The first SELF'ing intermeshing roller 202 includes a second section 218 that includes hexagon-shaped repeat units of ridges 214 of a second size that is smaller than the first size. Thus, along a length of the first SELF'ing intermeshing roller 202 the hexagon-shaped repeat units of ridges 212, 214 increase in size. FIG. 2 illustrates only a portion of the first SELF'ing intermeshing roller 202. The other portions of the first SELF'ing intermeshing roller 202 can include further sections of hexagon-shaped repeat units of ridges of differing sizes (e.g., a third, fourth, and fifth size).

The second SELF'ing intermeshing roller 204 can also include a plurality of ridges 220 and grooves 222 extending generally radially outward in a direction orthogonal to an axis of rotation. As shown the second SELF'ing intermeshing roller 204 lacks notches that break up the plurality of ridges 220. As a result, the second SELF'ing intermeshing roller 204 can be similar to a transverse direction ("TD") intermeshing roller such as the TD intermeshing rollers described in U.S. Pat. No. 9,186,862 to Broering et al., the disclosure of which is incorporated in its entirety by reference herein.

Passing a film, such as film 102c, through the SELF'ing intermeshing rollers 202, 204 can produce a thermoplastic film with one or more strainable networks formed by a structural elastic like process in which the strainable networks have a gradient pattern. As used herein, the term "strainable network" refers to an interconnected and interrelated group of regions which are able to be extended to some useful degree in a predetermined direction providing the web material with an elastic-like behavior in response to an applied and subsequently released elongation.

In particular, passing a thermoplastic film between the first SELF'ing intermeshing roller 202 and the second SELF'ing intermeshing roller 204 can form a plurality of deformations (e.g., raised rib-like elements) in a thermoplastic film that comprise deformation repeat units that are arranged in a gradient pattern such that the size of the deformation repeat units of protrusions are one or more of progressively larger or progressively smaller a length of the thermoplastic film. In other words, the SELF'ing intermeshing rollers 202, 204 can form a pattern of deformation repeat units that correspond to (e.g., have the same shape and size) as repeat units of ridges 212, 214 of the first SELF'ing intermeshing roller.

Figure 3:
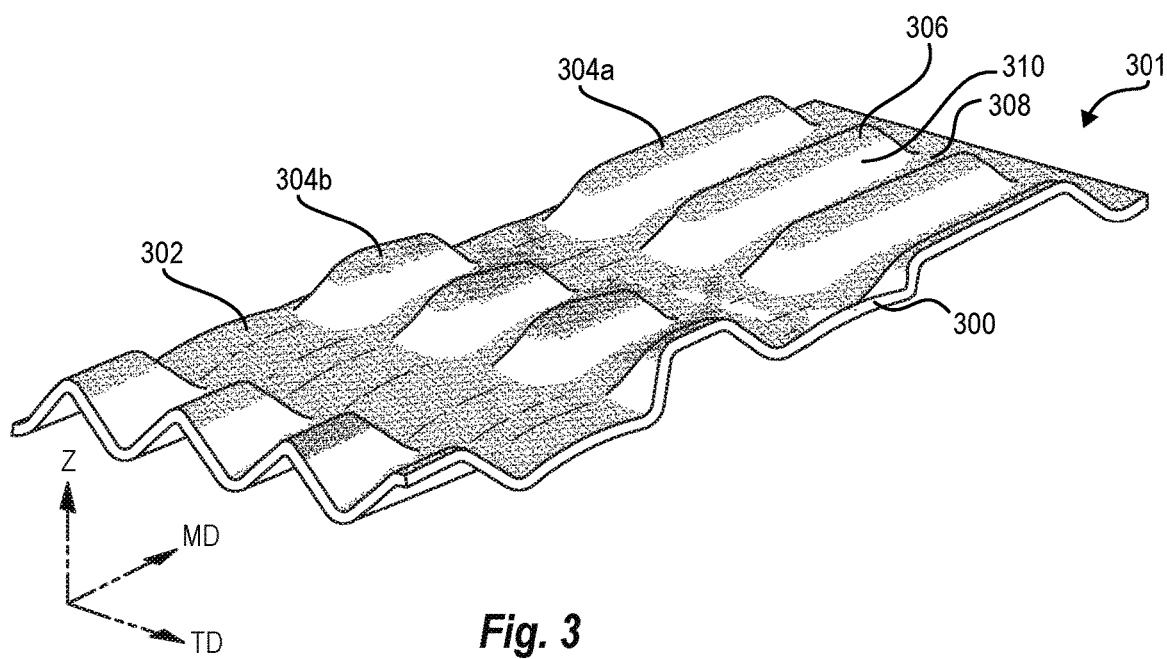
FIG. 3 shows a perspective view of a SELF'ed film according to one or more implementations of the present disclosure.

FIG. 3 shows a portion of the thermoplastic film 300 with the pattern 301 of deformations. As the film (e.g., multilayer film 102c) passes through the SELF'ing intermeshing rollers 202, 204, the ridges 206 can press a portion of the film out of plane defined by the film to cause permanent deformation of a portion of the film in the Z-direction. For example, the teeth 206 can intermittently stretch a portion of the film 102c in the Z-direction. The portions of the film 102c that pass between the notched regions 210 of the ridges 206 will remain substantially unformed in the Z-direction. As a result of the foregoing, the thermoplastic film 300 with the pattern 301 includes a plurality of isolated deformed, raised, rib-like elements 304a, 304b and at least one un-deformed portion (or web area) 302 (e.g., a relatively flat region). As will be understood by one of ordinary skill in the art, the length and width of the rib-like elements 304a, 304b depend on the length and width of ridges 206 and the speed and the depth of engagement of the intermeshing rollers 202, 204. The rib-like elements 304a, 304b and the un-deformed web areas 302 form a strainable network and can be grouped together in deformation repeat units that form a gradient pattern.

As shown in FIG. 3, the strainable network of the film 300 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304a, 304b of the strainable network. In one or more implementations, the first thicker regions 306 are the portions of the film with the greatest displacement in the Z-direction. In one or more implementations, because the film is displaced in the Z-direction by pushing the rib-like elements 304a, 304b in a direction perpendicular to a main surface of the thermoplastic film (thereby stretching the regions 310 upward) a total length and width of the film does not substantially change when the film is subjected to the SELF'ing process of one or more implementations. In other words, the film 102c (film prior to undergoing the SELF'ing process) can have substantially the same width and length as the film 300 resulting from the SELF'ing process.

As shown by FIG. 3, the rib-like elements can have a major axis and a minor axis (i.e., the rib-like elements are elongated such that they are longer than they are wide). As shown by FIG. 3, in one or more implementations, the major axes of the rib-like elements are parallel to the machine direction (i.e., the direction in which the film was extruded). In alternative implementations, the major axes of the rib-like elements are parallel to the transverse direction. In still further implementations, the major axes of the rib-like elements are oriented at an angle between 1 and 89 degrees relative to the machine direction. For example, in one or more implementations, the major axes of the rib-like elements are at a 45-degree angle to the machine direction. In one or more implementations, the major axes are linear (i.e., in a straight line) in alternative implementations the major axes are curved or have otherwise non-linear shapes.

The rib-like elements 304a, 304b can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304a, 304b can undergo geometric deformation before undergoing molecular-level deformation. For example, a strain applied to the film 300 in a perpendicular to the major axes of the rib-like elements 304a, 304b can pull the rib-like elements 304a, 304b back into plane with the web areas 302 prior to any molecular-level deformation of the rib-like elements 304a, 304b. Geometric deformation can result in significantly less resistive forces to an applied strain than that exhibited by molecular-level deformation.

As mentioned above, the rib-like elements 304a, 304b and the web areas 302 can be sized and positioned so as to create a gradient pattern of deformation repeat units. The gradient pattern can provide one or more of the benefits discussed herein. In one or more implementations, the deformation repeat units are visually distinct from the web areas 302. As used herein, the term "visually distinct" refers to features of the web material which are readily discernible to the normal naked eye when the web material or objects embodying the web material are subjected to normal use.

As mentioned above, the rib-like elements 304a, 304b can provide the film 300 with increased elasticity. In particular, the rib-like elements 304a, 304b can unfold and bend prior to stretching the web areas 302 or the rib-like elements 304a, 304b themselves. As such, areas of the film with larger rib-like elements 304a, 304b and more rib-like elements 304a, 304b can have greater elasticity and can be expanded to greater lengths before molecular deformation. As such, the portions of the thermoplastic film can be tailored to have desired strength and elasticity based on sizing/density of the rib-like elements 304a, 304b.

Figure 4:
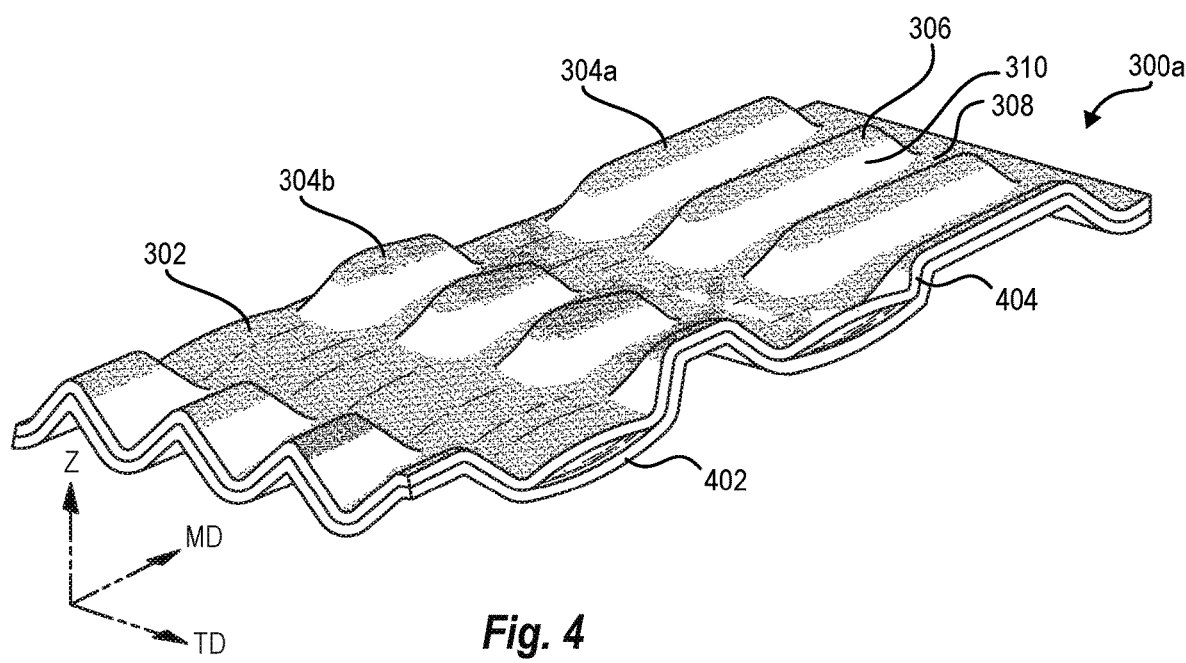
FIG. 4 shows a perspective view of a multi-layer SELF'ed film according to one or more implementations of the present disclosure.

In one or more implementations, the films with a deformations in a gradient pattern may comprise two or more distinct thermoplastic films (i.e., two films extruded separately). The distinct thermoplastic films can be non-continuously bonded to one another. For example, in one or more implementations two film layers can be passed together through a pair of SELF'ing rollers to produce a multi-layered lightly-bonded laminate film 300a, as shown in FIG. 4. The multi-layered lightly-bonded laminate film 300a can comprise a first thermoplastic film 402 partially discontinuously bonded to a second thermoplastic film 404. In one or more implementations, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

In one or more implementations, the first and second films 402, 404 may be discontinuously bonded together via one or more of the methods of bonding films together as described in U.S. Pat. No. 8,603,609, the disclosure of which is incorporated in its entirety by reference herein. In particular, the first and second films 402, 404 may be bonded via one or more of MD rolling, TD rolling, DD ring rolling, SELF'ing, pressure bonding, corona lamination, adhesives, or combinations thereof. In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

In addition to the foregoing, the first and second film 402, 404 can have differing colors. For example, in one or more implementations, the first film 402 is a translucent or transparent film that is lightly pigmented (e.g., light blue, light green), while the second film 404 is opaque or less transparent that the first film 404. In one or more implementations, the second film 404 can comprise a white color. The contrasting color of the first and second film 402, 404 can create a visual distinction between the bonded areas and the non-bonded areas of the films 402, 404, which in turn and make the deformations and the gradient pattern easier to see (e.g., more visually distinct).

Figure 5A:
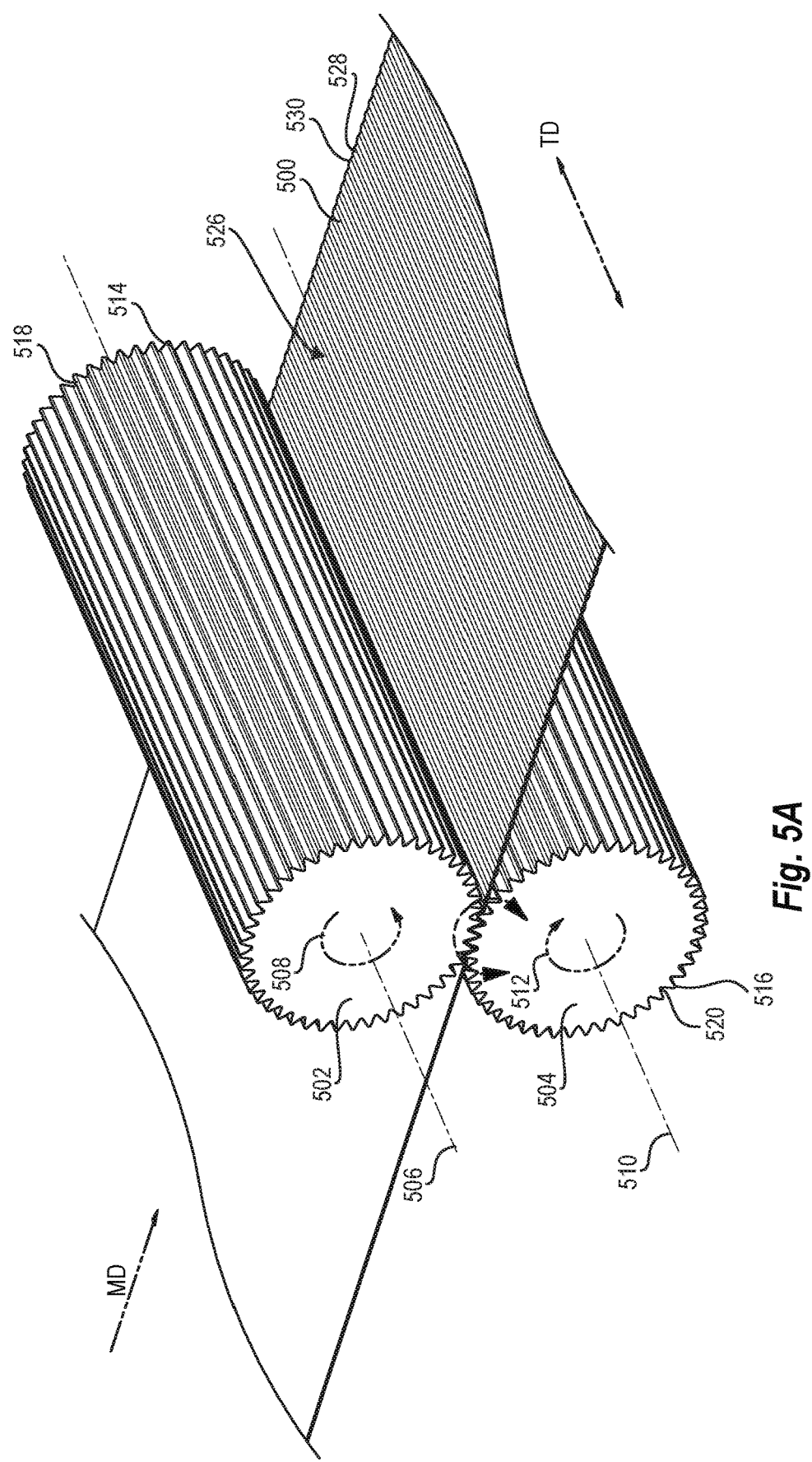
FIG. 5A shows a perspective view of a pair of ring rollers utilized to form patterns of deformations (e.g., thicker ribs and thinner, stretched webs) in films according to one or more implementations of the present disclosure.
Figure 5B:
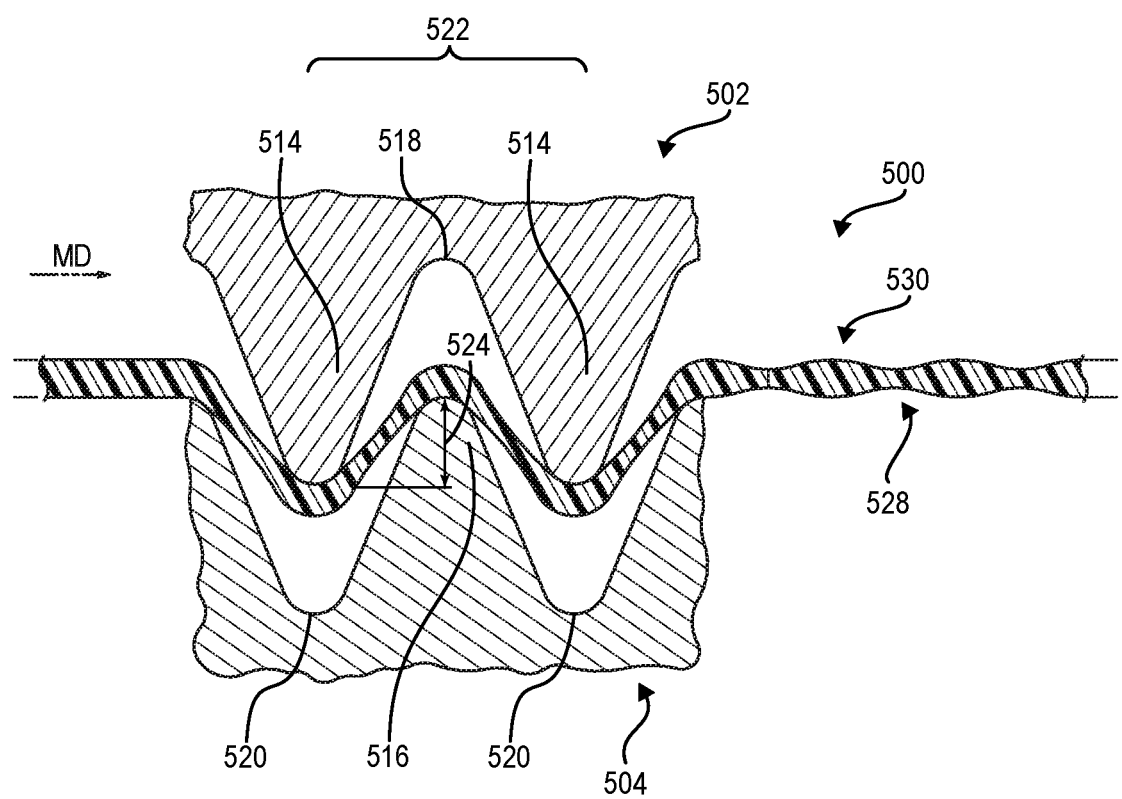
FIG. 5B shows a partial side view of a film passing through the ring rollers shown in FIG. 5A according to one or more implementations of the present disclosure.

As mentioned, the patterns of deformations and/or bonds can be formed via ring rolling in addition to SELFing. FIGS. 5A-5B show additional processes of forming deformations by way of machine direction (MD) ring rolling according to another implementation of the present disclosure. In particular, FIGS. 5A-5B illustrate an MD ring rolling process that intermittently stretches a film 500 in the machine direction (MD) or in other words the direction in which the films were extruded by passing the film 500 through a pair of MD intermeshing rollers 502, 504 (e.g., a first roller 502 and a second roller 504). The incremental stretching results in deformations in the form of ribs separated by thinner, stretched webs. For example, the process may include any of the rolling processes that intermittently stretches a film as described in U.S. patent application Ser. No. 13/289,829 to Borchardt, the disclosure of which is incorporated in its entirety by reference herein.

As shown by the FIGS. 5A-5B, each of the first roller 502 and the second roller 504 may have a generally cylindrical shape. In some implementations, the MD intermeshing rollers 502, 504 may comprise cast and/or machined metal, such as, e.g., steel, aluminum, or any other suitable material.

In operation, the MD intermeshing rollers 502, 504 can rotate in opposite directions about parallel axes of rotation. For example, as shown in FIG. 5A, the first roller 502 can rotate about a first axis 506 of rotation in a counterclockwise direction 508. FIG. 5A also illustrates that the second roller 504 can rotate about a second axis 510 of rotation in a clockwise direction 512. The axes of rotation 506, 510 can be parallel to the transverse direction (TD) and perpendicular to the machine direction MD.

The intermeshing rollers 502, 504 can closely resemble fine pitch spur gears. In particular, the MD intermeshing rollers 502, 504 can include a plurality of protruding ridges 514, 516 extending radially outward from the axes of rotation 506, 510 of the intermeshing rollers 502, 504. The ridges 514, 516 can be defined by grooves 518, 520 between adjacent ridges 514, 516. For example, grooves 518, 520 can separate adjacent ridges 514, 516. The ridges 514, 516 can extend along the MD intermeshing rollers 502, 504 in a direction generally parallel to axes of rotation 506, 510 and perpendicular to the machine direction of the film 500 passing through the MD intermeshing rollers 502, 504. The ridges 514, 516 can include tips, and the tips of ridges 514, 516 can have a variety of different shapes and configurations. For example, the tips of the ridges 514, 516 can have a rounded shape as shown in FIG. 5B. In alternative implementations, the tips of the ridges 514, 516 can have sharp angled corners.

The ridges 514 on the first roller 502 can be offset or staggered with respect to the ridges 516 on the second roller 504. Thus, the grooves 518 of the first roller 502 can receive the ridges 516 of the second roller 504, as the MD intermeshing rollers 502, 504 intermesh. Similarly, the grooves 520 of the second roller 504 can receive the ridges 514 of the first roller 502.

One will appreciate in view of the disclosure herein that the configuration of the ridges 514, 516 and grooves 518, 520 can prevent contact between ridges 514, 516 during intermeshing so that no rotational torque is transmitted during operation. Additionally, the configuration of the ridges 514, 516 and grooves 518, 520 can affect the amount of intermittent stretching as the film passes through MD intermeshing rollers 502, 504.

Referring specifically to FIG. 5B, various features of the ridges 514, 516 and grooves 518, 520 are shown in greater detail. The pitch and depth of engagement of the ridges 514, 516 can determine, at least in part, the amount of incremental stretching caused by the MD intermeshing rollers 502, 504. As shown by FIG. 5B, the pitch 522 is the distance between the tips of two adjacent ridges on the same roller. The "depth of engagement" ("DOE") 524 is the amount of overlap between ridges 514, 516 of the different MD intermeshing rollers 502, 504 during intermeshing. According to one implementation, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 5A, the direction of travel of the film 500 through the MD intermeshing rollers 502, 504 is parallel to the machine direction and perpendicular to the transverse direction. As the film 500 passes between the MD intermeshing rollers 502, 504, the ridges 514, 516 can intermittently stretch the film 500 in the machine direction. In one or more implementations, stretching the film 500 in the machine direction can reduce the gauge of the film and increase the length of the film 500. In other implementations, the film 500 may rebound after stretching such that the gauge of the film 500 is not decreased. Furthermore, in one or more implementations, stretching the film 500 in the machine direction can reduce the width of the film 500. For example, as the film 500 is lengthened in the machine direction, the film's length can be reduced in the transverse direction.

In particular, as the film 500 proceeds between the MD intermeshing rollers 502, 504, the ridges 514 of the first roller 502 can push the film 500 into the grooves 520 of the second roller 504 and vice versa. The pulling of the film 500 by the ridges 514, 516 can stretch the film 500. The MD intermeshing rollers 502, 504 may not stretch the film 500 evenly along its length. Specifically, the MD intermeshing rollers 502, 504 can stretch the portions of the film 500 between the ridges 514, 516 more than the portions of the film 500 that contact the ridges 514, 516. Thus, the MD intermeshing rollers 502, 504 can impart or form a generally striped pattern 526 into the film 500. As used herein, the terms "impart" and "form" refer to the creation of a desired structure or geometry in a film upon stretching the film that will at least partially retain the desired structure or geometry when the film is no longer subject to any strains or externally applied forces.

As seen in FIG. 5B, upon stretching, the stretched multi-layer film can include a striped pattern 526. The striped pattern 526 can include alternating series of deformations. In particular, the striped pattern 526 can include stretched (or more stretched) regions or thinner webs 528 adjacent to thicker regions (or less stretched) or ribs 530.

While FIGS. 5A-5B illustrate MD intermeshing rollers and an MD incrementally stretched film, other implementations can comprise TD intermeshing rollers or helical intermeshing rollers to create TD incrementally stretched or helically incrementally stretched films and associated deformations. The helical intermeshing rollers can have teeth oriented between 1 degree and 89 degrees relative to an axis of rotation of the helical intermeshing rollers. Still further implementations comprise MD and TD incrementally stretched films.

Figure 6:
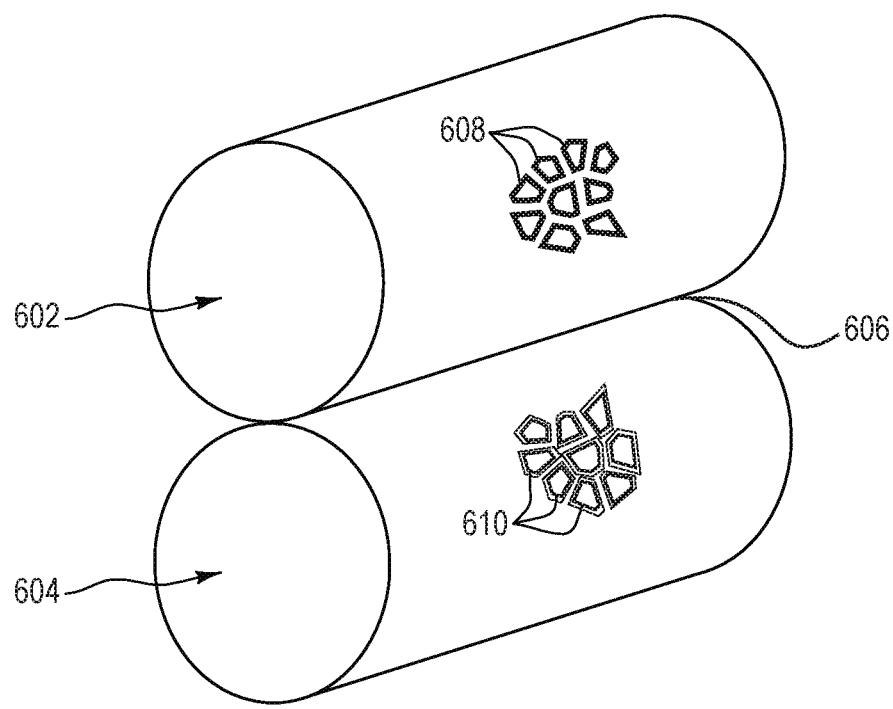
FIG. 6 shows a perspective view of a pair of embossing rollers utilized to form patterns of deformations (e.g., formations pressed into the film) in films according to one or more implementations of the present disclosure.

As mentioned, the patterns of deformations can be formed via embossing in addition to SELFing and ring rolling. FIG. 6 illustrates a pair of embossing rollers 602, 604 for forming a pattern of deformations in a film material that produce a three-dimensional effect. Specifically, the pair of embossing rollers 602, 604 may include a first embossing roller 602 and a second embossing roller 604. Each of the first and second embossing rollers 602, 604 may be cylindrical and may have longitudinal axes that are parallel to each other. The first and second embossing rollers 602, 604 may define a passage 606 therebetween through which a film material may pass through to be embossed.

In some implementations, as shown in FIG. 6, a first embossing roller 602 may have an embossing pattern 608 formed thereon, and the second embossing roller 604 may have a correlating (e.g., matching) receiving embossing pattern 610 thereon (e.g., engraved therein). The embossing pattern 608 of the first embossing roller 602 may have height of between about 10.0 mils and about 40.0 mils, and the receiving embossing pattern 610 of the second embossing roller 604 may have depth of between about 10.0 mils and about 40.0 mils. While FIG. 6 illustrates that the embossing pattern 608 and the receiving embossing pattern 610 include a plurality of random polygon shaped protrusions and a plurality of matching random polygon shaped recesses, the embossing pattern can be configured in various shapes so as to produce a pattern(s) of deformations that create a three-dimensional effect. In other words, the embossing pattern shown in FIG. 6 is a non-limiting example for ease in explanation.

In some implementations, one of the first and second embossing rollers 602, 604 may be formed from a relatively hard material (e.g., steel, ebonite or other suitable hard material), and the other may be formed from a softer material (e.g., rubber or other suitable softer material). In other words, the first and second embossing rollers 602, 604 may include a steel-to-rubber embosser. In alternative implementations, both the first and second embossing rollers 602, 604 may be formed from the relatively hard material (e.g., steel). Put another way, first and second embossing rollers 602, 604 may include a steel-to-steel embosser. Regardless of whether the first and second embossing rollers 602, 604 include a steel-to-rubber embosser or a steel-to-steel embosser, in some implementations, the one or more of first and second embossing rollers 602, 604 may include an electrically heated steel roll (e.g., means of heating). In alternative implementations, neither of the first and second embossing rollers 602, 604 are heated.

Figure 7A:
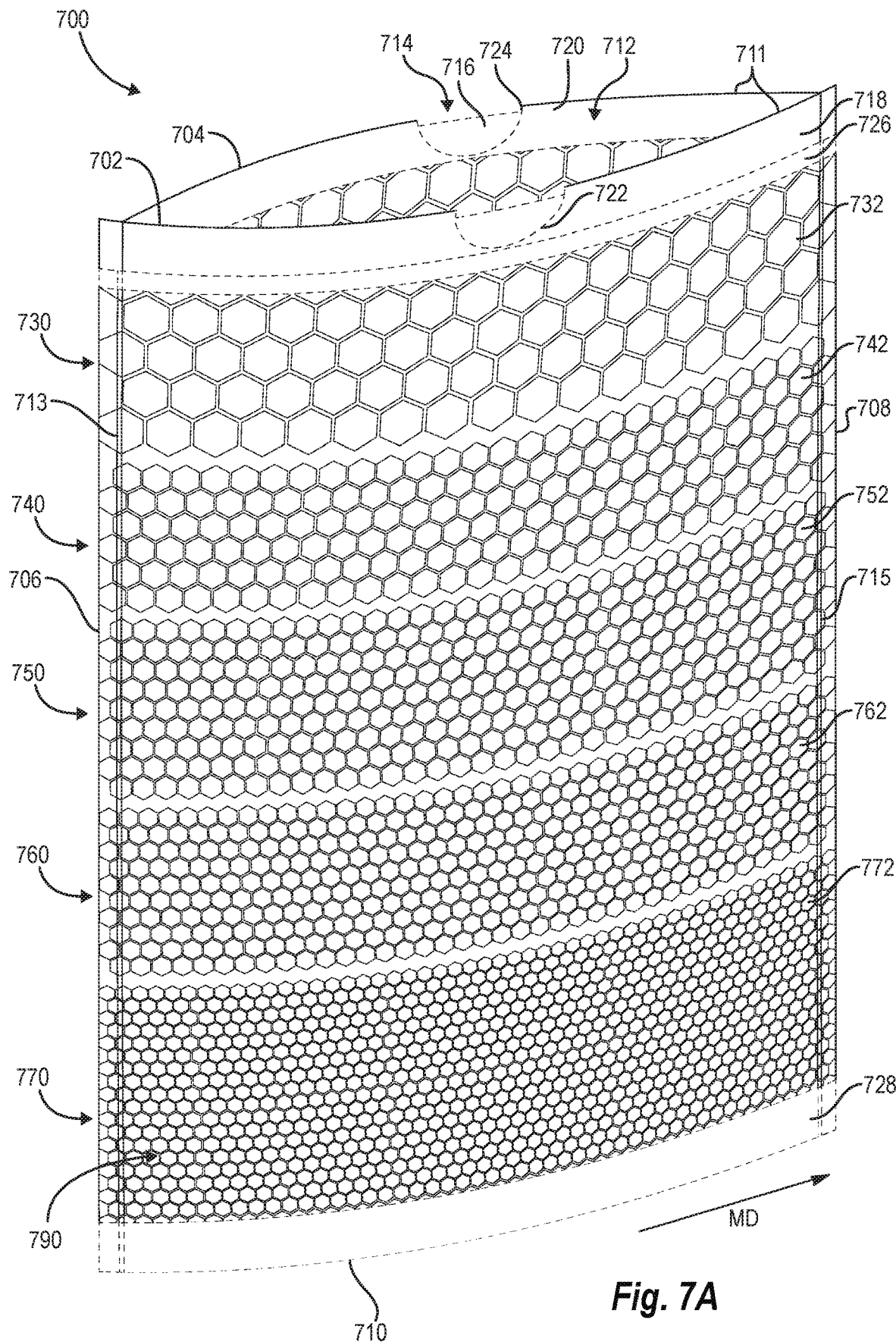
FIG. 7A shows a perspective view of a thermoplastic bag having deformations arranged in a gradient pattern according to one or more implementations of the present disclosure.

Whether created by SELFing, ring rolling, embossing, or combinations thereof, the deformations can form a gradient pattern. For example, FIG. 7A is a perspective view of a thermoplastic bag 700 with a gradient pattern 790 of deformations according to an implementation of the present disclosure. FIGS. 7B-7E are front, back, side, top, and bottom view of the thermoplastic bag 700 with deformations in a gradient pattern 790. The thermoplastic bag 700 with a gradient pattern of deformations includes a first sidewall 702 and a second sidewall 704. Each of the first and second sidewalls 702, 704 includes a first side edge 706, a second opposite side edge 708, a bottom edge 710 extending between the first and second side edges 706, 708, and top edge 711 extending between the first and second side edges 706, 708 opposite the bottom edge 710. In some implementations, the first sidewall 702 and the second sidewall 704 are joined together along the first side edges 706, the second opposite side edges 708, and the bottom edges 710. The first and second sidewalls 702, 704 may be joined along the first and second side edges 706, 708 and bottom edges 710 by any suitable process such as, for example, a heat seal. For example, FIG. 7A illustrates that the first and second sidewalls 702, 704 are joined by heat seals 713, 715 at the first and second side edges 706, 708. In alternative implementations, the first and second sidewalls 702, 704 may not be joined along the side edges. Rather, the first and second sidewalls 702, 704 may be a single uniform piece. In other words, the first and second sidewalls 702, 704 may form a sleeve or a balloon structure.

In some implementations, the bottom edge 710 or one or more of the side edges 706, 708 can comprise a fold. In other words, the first and second sidewalls 702, 704 may comprise a single unitary piece of material. The top edges 711 of the first and second sidewalls 702, 704 may define an opening 712 to an interior of the thermoplastic bag 700 with a gradient pattern of deformations. In other words, the opening 712 may be oriented opposite the bottom edge 710 of the thermoplastic bag 700 with a gradient pattern of deformations. Furthermore, when placed in a trash receptacle, the top edges 711 of the first and second sidewalls 702, 704 may be folded over the rim of the receptacle.

In some implementations, the thermoplastic bag 700 with a gradient pattern of deformations may optionally include a closure mechanism 714 located adjacent to the top edges 711 for sealing the top of the thermoplastic bag 700 with a gradient pattern of deformations to form an at least substantially fully-enclosed container or vessel. As shown in FIG. 7A, in some implementations, the closure mechanism 714 comprises a draw tape 716, a first hem 718, and a second hem 720. In particular, the first top edge 711 of the first sidewall 702 may be folded back into the interior volume and may be attached to an interior surface of the first sidewall 702 to form the first hem 718. Similarly, the second top edge 711 of the second sidewall 704 is folded back into the interior volume and may be attached to an interior surface of the second sidewall 704 to form a second hem 720. The draw tape 716 extends through the first and second hems 718, 720 along the first and second top edges 711. The first hem 718 includes a first aperture 722 (e.g., notch) extending through the first hem 718 and exposing a portion of the draw tape 716. Similarly, the second hem 720 includes a second aperture 724 extending through the second hem 720 and exposing another portion of the draw tape 716. During use, pulling the draw tape 716 through the first and second apertures 722, 724 will cause the first and second top edge 711 to constrict. As a result, pulling the draw tape 716 through the first and second apertures 722, 724 will cause the opening 712 of the thermoplastic bag with a gradient pattern of deformations to at least partially close or reduce in size. The draw tape closure mechanism 714 may be used with any of the implementations of a reinforced thermoplastic bag described herein.

Although the thermoplastic bag 700 with a gradient pattern of deformations is described herein as including a draw tape closure mechanism 714, one of ordinary skill in the art will readily recognize that other closure mechanisms 714 may be implemented into the thermoplastic bag 700 with a gradient pattern of deformations. For example, in some implementations, the closure mechanism 714 may include one or more of flaps, adhesive tapes, a tuck and fold closure, an interlocking closure, a slider closure, a zipper closure, or any other closure structures known to those skilled in the art for closing a bag.

As shown by FIG. 7A, the thermoplastic bag 700 with a gradient pattern of deformations can comprise areas or zones devoid of deformations. In particular, FIG. 7A illustrates that the thermoplastic bag 700 with a gradient pattern of deformations can comprise a top zone 726 adjacent the hems 718, 720 that is devoid of deformations. Similarly, FIG. 7A illustrates that the thermoplastic bag 700 with a gradient pattern of deformations can comprise a bottom zone 728 adjacent the bottom edge 710 that is devoid of deformations.

The first and second sidewalls 702, 704 can comprise a single film with deformations (e.g., film 300) or a multi-layered lightly-bonded laminate film (e.g., film 300a). Furthermore, each of the films 300, 300a can be a single layered, bi-layered, or tri-layered film (e.g., films 102a, 102b, or 102c). In implementations in which the first and second sidewalls 702, 704 a multi-layered lightly-bonded laminate film, the thermoplastic bag 700 with deformations in a gradient pattern 790 can comprise a bag-in-bag configuration. In particular, the thermoplastic bag 700 with deformations in a gradient pattern 790 can comprise a first thermoplastic bag. The first thermoplastic bag can comprise first and second opposing sidewalls (e.g., the first thermoplastic film 402 of the multi-layer laminate 300a) joined together along a first side edge 706, an opposite second side edge 708, and a closed bottom edge 710. The thermoplastic bag 700 with deformations in a gradient pattern 790 can comprise a second thermoplastic bag positioned within the first thermoplastic bag. The second thermoplastic bag can comprise third and fourth opposing sidewalls (e.g., the second thermoplastic film 404 of the multi-layer laminate 300a) joined together along a first side edge 706, an opposite second side edge 708, and a closed bottom edge 710. Furthermore, the first and second thermoplastic bags can be lightly bonded together by bonds aligned with the protrusions as explained above.

Figure 7B:
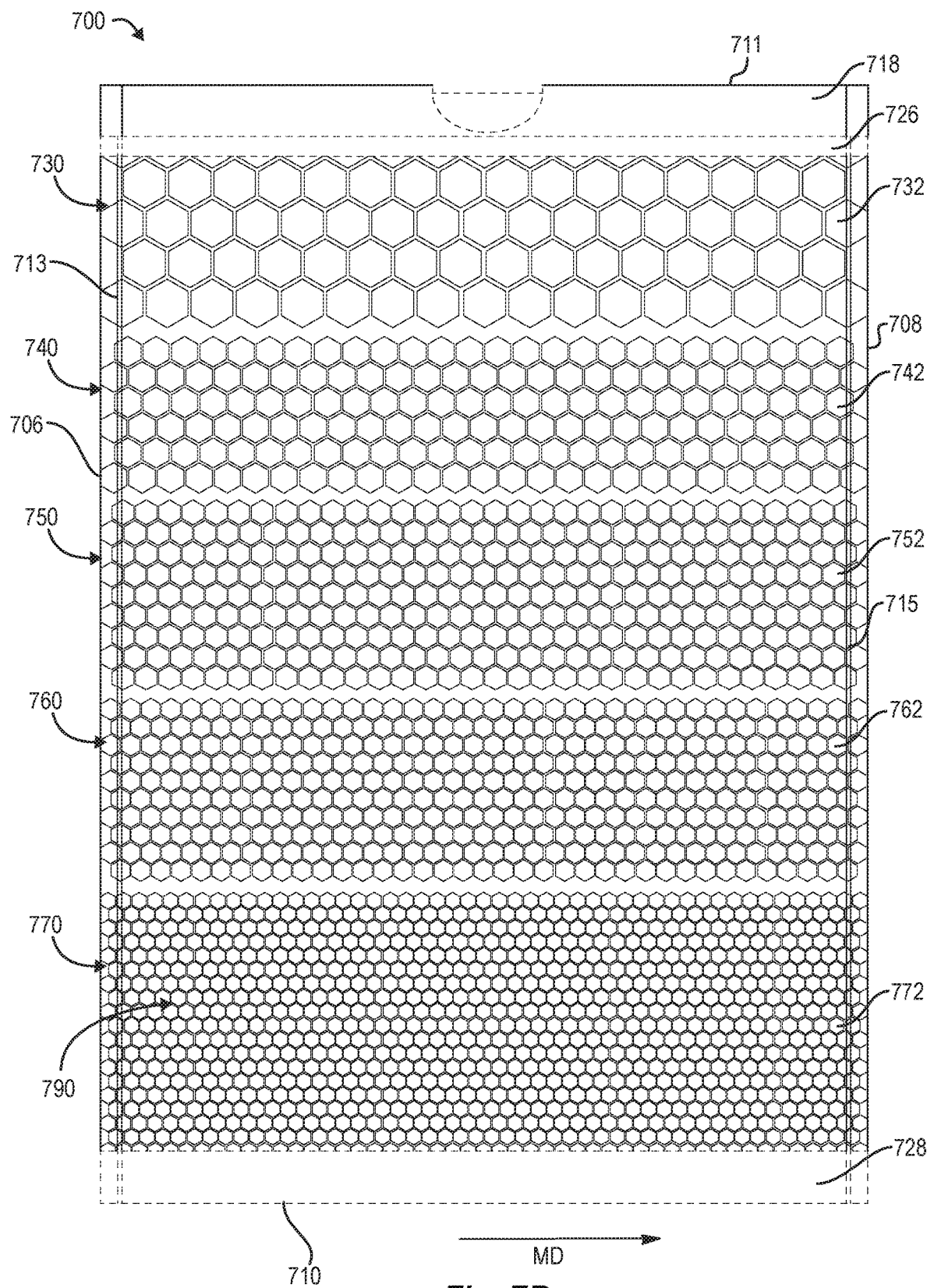
FIG. 7B shows a front view of the thermoplastic bag having deformations arranged in a gradient pattern of FIG. 7A.
Figure 7C:
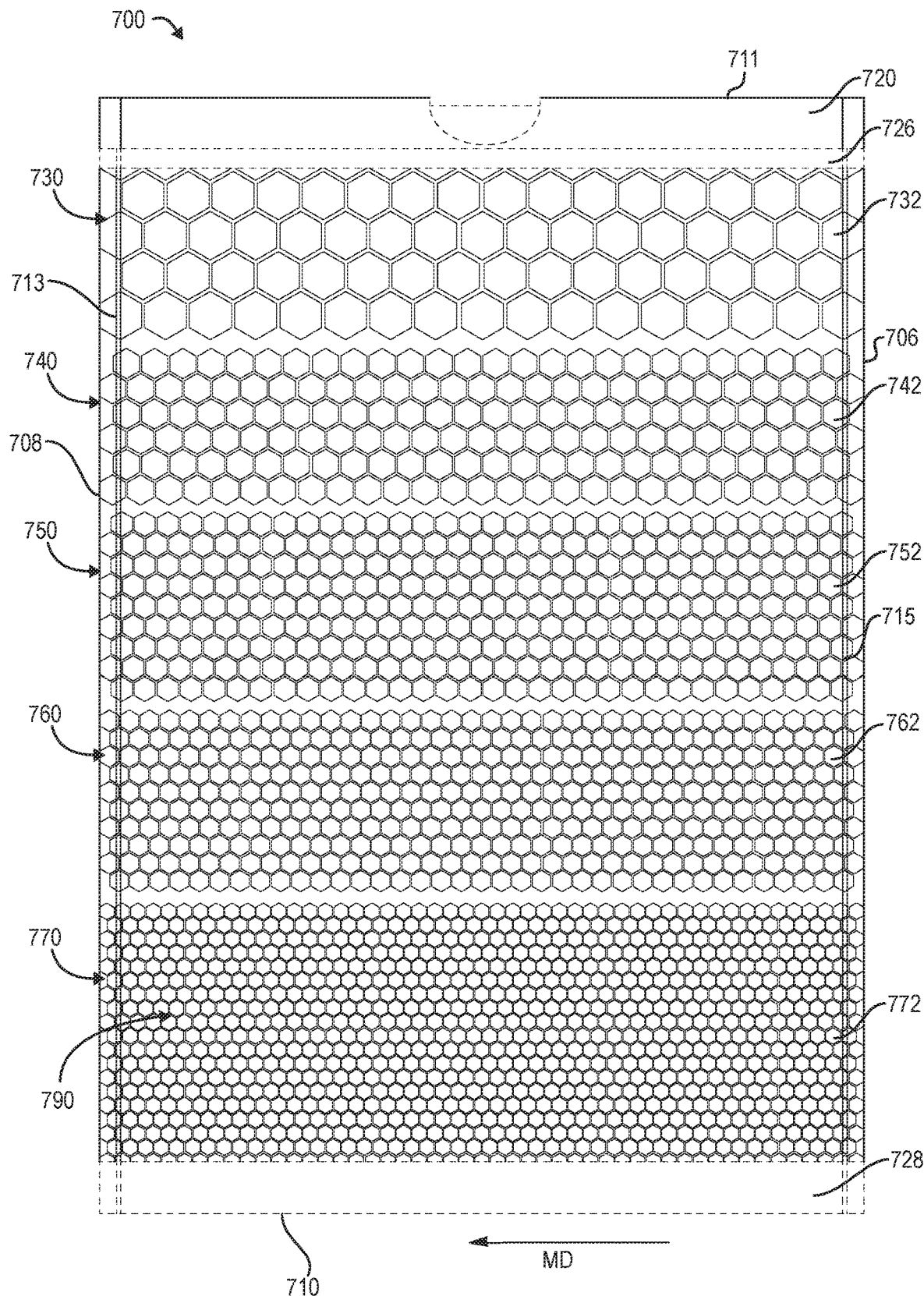
FIG. 7C shows a back view of the thermoplastic bag having deformations arranged in a gradient pattern of FIG. 7A.
Figure 7D:
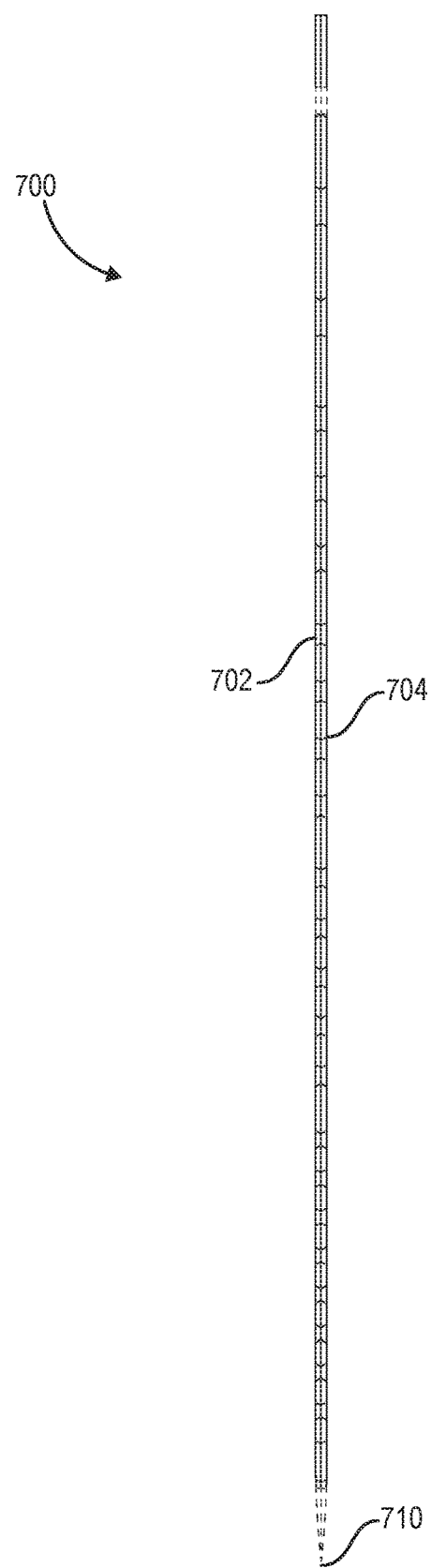
FIG. 7D shows a side view of the thermoplastic bag having deformations arranged in a gradient pattern of FIG. 7A.
Figure 7E:
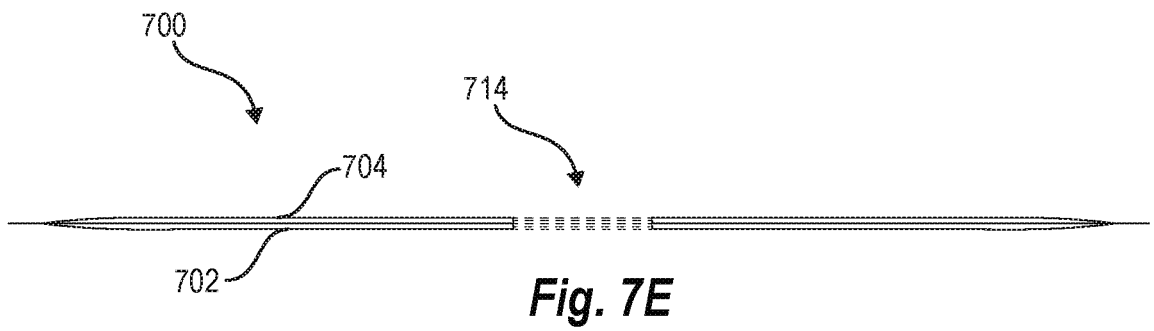
FIG. 7E shows a top view of the thermoplastic bag having deformations arranged in a gradient pattern of FIG. 7A.
Figure 7F:
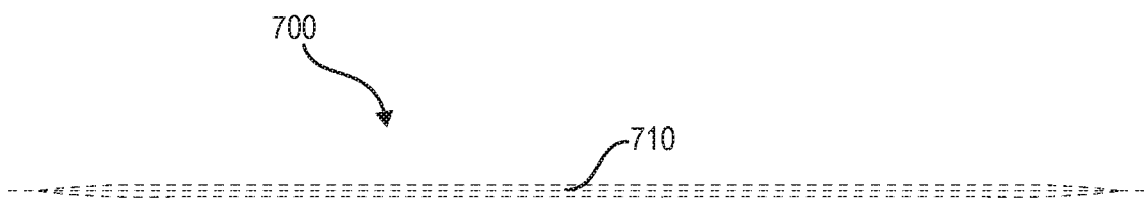
FIG. 7F shows a bottom view of the thermoplastic bag having deformations arranged in a gradient pattern of FIG. 7A.

As shown by FIGS. 7A-7C, the gradient pattern 790 of deformations can comprise deformation repeat units 732, 742, 752, 762, 772 of differing sizes arranged so that they are progressively larger or progressively smaller across a length of the thermoplastic films forming the first and second side walls 702, 704. In particular, FIGS. 7A-7C illustrate that the deformation repeat units 732, 742, 752, 762, 772 are increasingly larger along a height (i.e., TD direction) of the thermoplastic bag from the bottom edge 710 to the top edges 711.

More particularly, FIGS. 7A-7C illustrate that the thermoplastic bag 700 includes a first section 730 comprising a first plurality of deformations grouped or arranged to form first deformation repeat units 732. The first deformation repeat units 732 have a first size and a first shape (i.e., hexagon shape). Similarly, the thermoplastic bag 700 includes a second section 740 comprising a second plurality of deformations grouped or arranged to form second deformation repeat units 742. The second deformation repeat units 742 have a second size that is smaller than the first size and the first shape. Furthermore, the thermoplastic bag 700 includes a third section 750 comprising a third plurality of deformations grouped or arranged to form third deformation repeat units 752. The third deformation repeat units 752 have a third size that is smaller than the second size and the first shape. Also, the thermoplastic bag 700 includes a fourth section 760 comprising a fourth plurality of deformations grouped or arranged to form fourth deformation repeat units 762. The fourth deformation repeat units 762 have a fourth size that is smaller than the third size and the first shape. Additionally, the thermoplastic bag 700 includes a fifth section 770 comprising a fifth plurality of deformations grouped or arranged to form fifth deformation repeat units 772. The fifth deformation repeat units 772 have a fifth size that is smaller than the fourth size and the first shape. In alternative implementations, the gradient pattern 790 of deformations can include more or less than five sizes of deformation repeat units.

FIGS. 7A-7C illustrate that the gradient pattern 790 of deformations include deformation repeat units that are progressively larger or progressively smaller in a single direction (e.g., along the height of the bag 700 or TD direction). As such, the deformation repeat units maintain a consistent size along the width of the bag or MD direction. In particular, the first section 730 (e.g., a section that extends from the first side edge 706 to the second side edge 708 a first distance in the TD direction) includes deformation repeat units 732 of the same size. In this manner, the first section 730 has consistent physical parameters provided by the deformation repeat units (e.g., consistent elasticity or tear resistance). Similarly, the other sections 740, 750, 760, 770 can also have consistently sized deformation repeat units that provide consistent physical parameters to the respective section.

As shown by FIGS. 7A-7C, each section 730, 740, 750, 760, 770 can comprise multiple rows of deformation repeat units. In particular, the first section 730 includes four rows of the first deformation repeat units 732, the second section 730 includes six rows of the second deformation repeat units 742, the third section 750 includes nine rows of the third deformation repeat units 752, the fourth section 760 includes ten rows of the fourth deformation repeat units 762, and the fifth section 770 includes eighteen and a half rows of the fifth deformation repeat units 772.

As shown in FIGS. 7A-7C, the sections 730, 740, 750, 760, 770 are each separated by a transition zone or area that is devoid of deformations. One will appreciate in light of the disclosure herein that other implementations can have section 730, 740, 750, 760, 770 of deformation repeat units that are not separated by transition zones. For example, FIG. 8 illustrates a thermoplastic bag 700a similar to the thermoplastic bag 700 of FIGS. 7A-7F albeit that the sections 730, 740, 750, 760, 770 of deformation repeat units directly abut each other.

Figure 8:
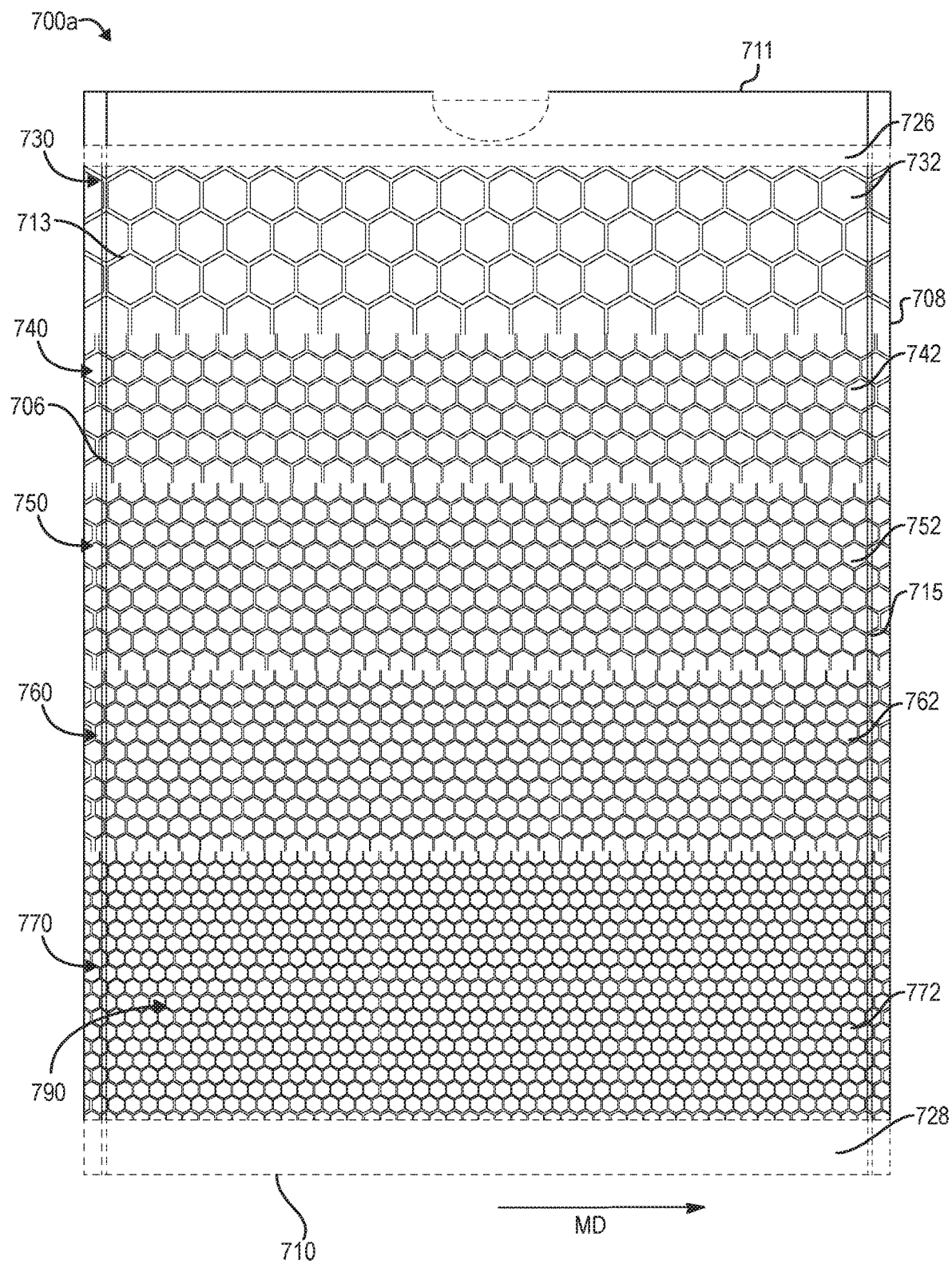
FIG. 8 shows a front view of another thermoplastic bag having deformations arranged in a gradient pattern according to one or more implementations of the present disclosure.
Figure 9:
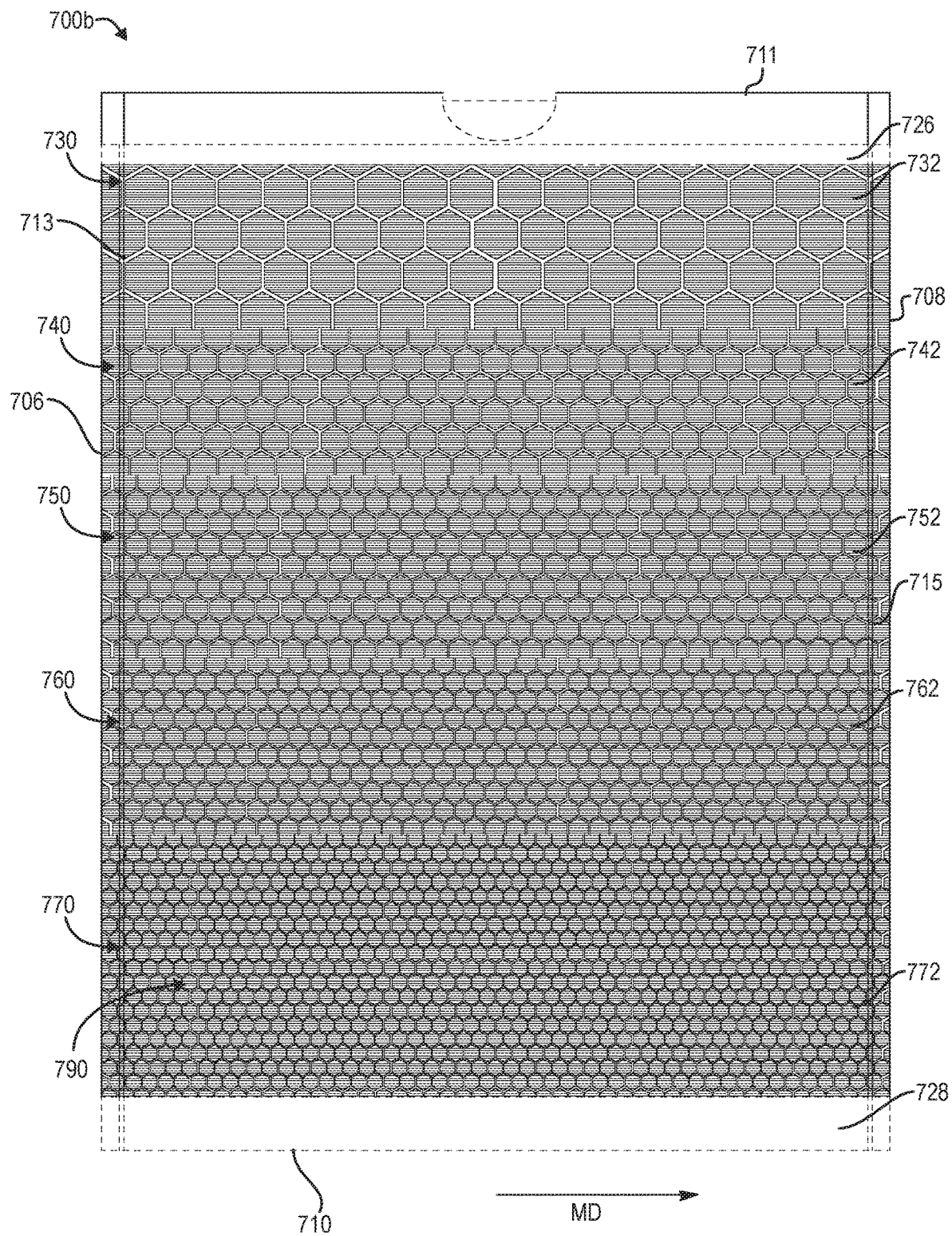
FIG. 9 shows a front view of yet another thermoplastic bag having deformations arranged in a gradient pattern according to one or more implementations of the present disclosure.

The deformations and repeat units shown in FIGS. 7A-8 are generalized so as to represent any of the various types of deformations discussed herein (e.g., embossing, ring rolling, SELFing). FIG. 9 on the other hand illustrates a thermoplastic bag 700b similar to the thermoplastic bag 700a albeit with TD SELF'ing deformations. In particular, each of the first deformation repeat units 732, 742, 752, 762, 772 comprise a plurality of TD SELF'ing deformations (e.g., raised rib-like elements extending in the MD direction) of various lengths that create hexagon shapes.

Figure 10:
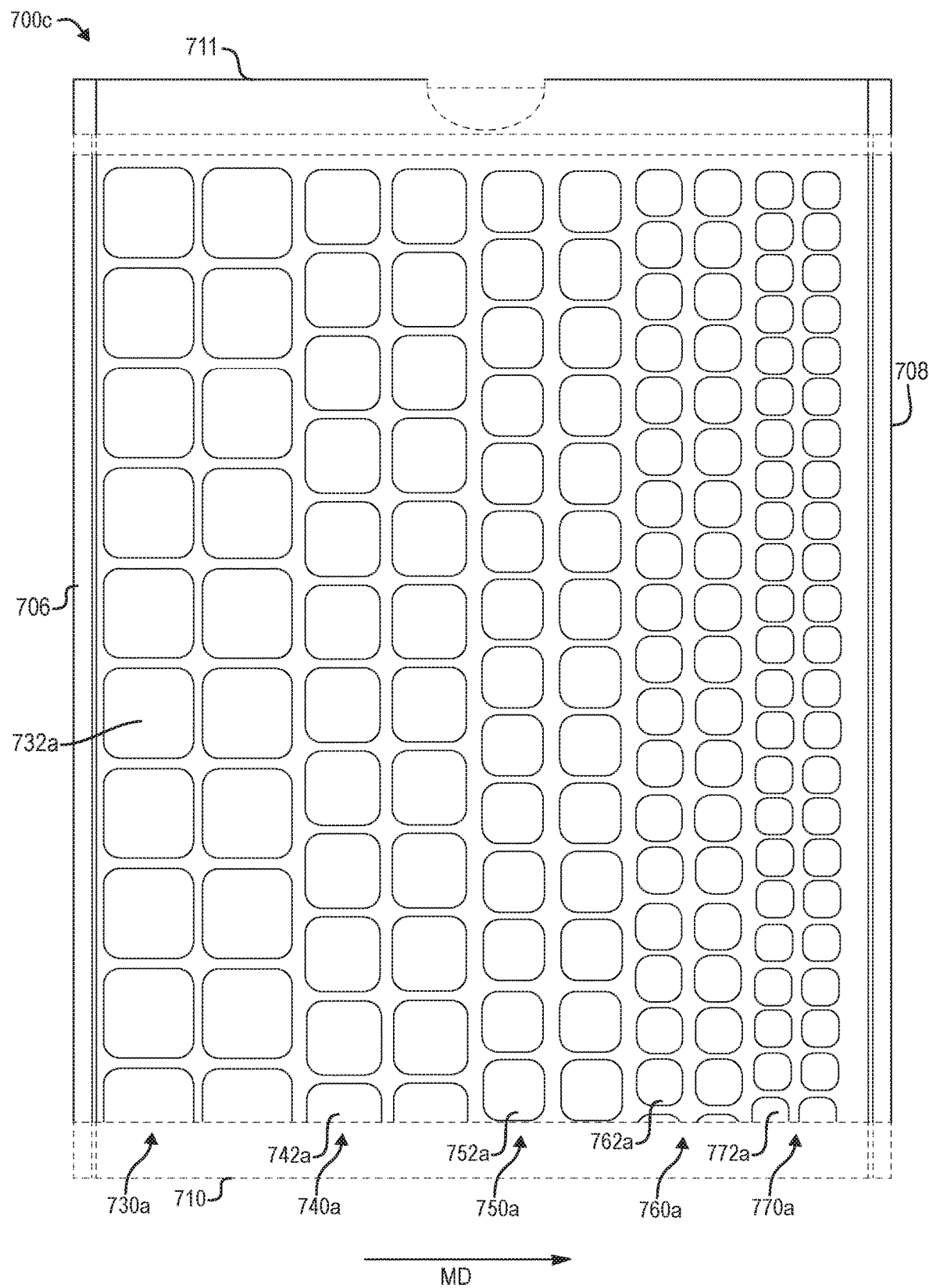
FIG. 10 shows a front view of a thermoplastic bag having deformations arranged in a gradient pattern across a width of the thermoplastic bag according to one or more implementations of the present disclosure.

As mentioned previously, one or more implementations described herein include deformation repeat units that are arranged in a gradient pattern such that the size of the deformation repeat units are one or more of progressively larger or progressively smaller along a length of the thermoplastic bag. The thermoplastic bags 700-700b shown and described above include gradient patterns of deformations with repeat units are one or more of progressively larger or progressively smaller along a height or TD direction. FIG. 10 on the other hand shows a thermoplastic bag 700c, similar to the thermoplastic bag 700, albeit with a gradient pattern of deformations with repeat units are one or more of progressively larger or progressively smaller along a width or MD direction.

As shown by FIG. 10, the gradient pattern of deformations can comprise deformation repeat units 732a, 742a, 752a, 762a, 772a of differing sizes arranged so that they are progressively larger or progressively smaller across a width of the thermoplastic films forming the first and second side walls. In particular, FIG. 10 illustrates that the deformation repeat units 732a, 742a, 752a, 762a, 772a are increasingly smaller along a width (i.e., MD direction) of the thermoplastic bag from the first side edge 706 to the second side edge 708.

More particularly, FIG. 10 illustrates that the thermoplastic bag 700c includes a first section 730a comprising a first plurality of deformations grouped or arranged to form first deformation repeat units 732a. The first deformation repeat units 732a have a first size and a first shape (i.e., square shape). Similarly, the thermoplastic bag 700c includes a second section 740a comprising a second plurality of deformations grouped or arranged to form second deformation repeat units 742a. The second deformation repeat units 742a have a second size that is smaller than the first size and the first shape. Furthermore, the thermoplastic bag 700c includes a third section 750a comprising a third plurality of deformations grouped or arranged to form third deformation repeat units 752a. The third deformation repeat units 752a have a third size that is smaller than the second size and the first shape. Also, the thermoplastic bag 700c includes a fourth section 760a comprising a fourth plurality of deformations grouped or arranged to form fourth deformation repeat units 762a. The fourth deformation repeat units 762a have a fourth size that is smaller than the third size and the first shape. Additionally, the thermoplastic bag 700c includes a fifth section 770a comprising a fifth plurality of deformations grouped or arranged to form fifth deformation repeat units 772a. The fifth deformation repeat units 772a have a fifth size that is smaller than the fourth size and the first shape. In alternative implementations, the gradient pattern of deformations can include more or less than five sizes of deformation repeat units.

Figure 11:
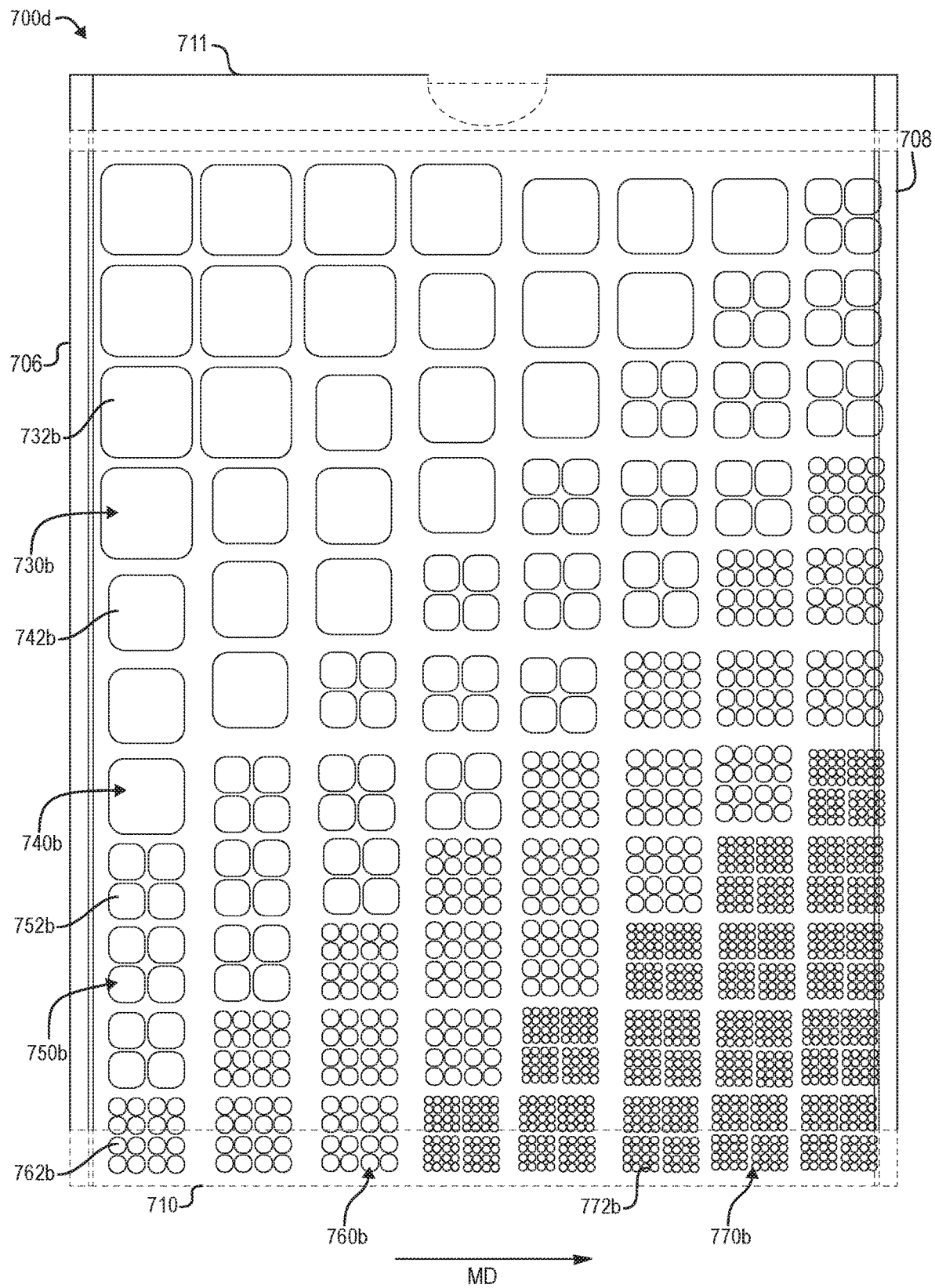
FIG. 11 shows a front view of a thermoplastic bag having deformations arranged in a gradient pattern across a width and height of the thermoplastic bag according to one or more implementations of the present disclosure.

As mentioned previously, one or more implementations described herein include deformation repeat units that are arranged in a gradient pattern such that the size of the deformation repeat units are one or more of progressively larger or progressively smaller along one or more lengths of a thermoplastic bag/film. The thermoplastic bags 700-700c shown and described above include gradient patterns of deformations with repeat units are one or more of progressively larger or progressively smaller along a single direction. FIG. 11 on the other hand shows a thermoplastic bag 700d, similar to the thermoplastic bag 700b, albeit with a gradient pattern of deformations with repeat units are one or more of progressively larger or progressively along two directions (e.g., both the width and height of the bag or the MD and TD directions of the thermoplastic film forming the sidewalls of the bag 700c).

As shown by FIG. 11, the gradient pattern of deformations can comprise deformation repeat units 732b, 742b, 752b, 762b, 772b of differing sizes arranged so that they are progressively larger or progressively smaller across the width and height of the thermoplastic films forming the first and second side walls. In particular, FIG. 11 illustrates that the deformation repeat units 732b, 742b, 752b, 762b, 772b are increasingly smaller along a width (i.e., MD direction) of the thermoplastic bag from the first side edge 706 to the second side edge 708 and increasingly smaller along a height (i.e., TD direction) of the thermoplastic bag from the top edge 711 to the bottom edge 710.

More particularly, FIG. 11 illustrates that the thermoplastic bag 700d includes a first section 730b comprising a first plurality of deformations grouped or arranged to form first deformation repeat units 732b. The first deformation repeat units 732b have a first size and a first shape (i.e., square shape). Similarly, the thermoplastic bag 700d includes a second section 740b comprising a second plurality of deformations grouped or arranged to form second deformation repeat units 742b. The second deformation repeat units 742b have a second size that is smaller than the first size and the first shape. Furthermore, the thermoplastic bag 700d includes a third section 750b comprising a third plurality of deformations grouped or arranged to form third deformation repeat units 752b. The third deformation repeat units 752b have a third size that is smaller than the second size and the first shape. Also, the thermoplastic bag 700d includes a fourth section 760b comprising a fourth plurality of deformations grouped or arranged to form fourth deformation repeat units 762b. The fourth deformation repeat units 762b have a fourth size that is smaller than the third size and the first shape. Additionally, the thermoplastic bag 700d includes a fifth section 770b comprising a fifth plurality of deformations grouped or arranged to form fifth deformation repeat units 772b. The fifth deformation repeat units 772b have a fifth size that is smaller than the fourth size and the first shape. In alternative implementations, the gradient pattern of deformations can include more or less than five sizes of deformation repeat units. The sections of deformations 730b, 740b, 750b, 760b, and 770b are oriented along a diagonal direction (e.g., a direction that is not parallel to either the MD or TD direction).

Figure 12:
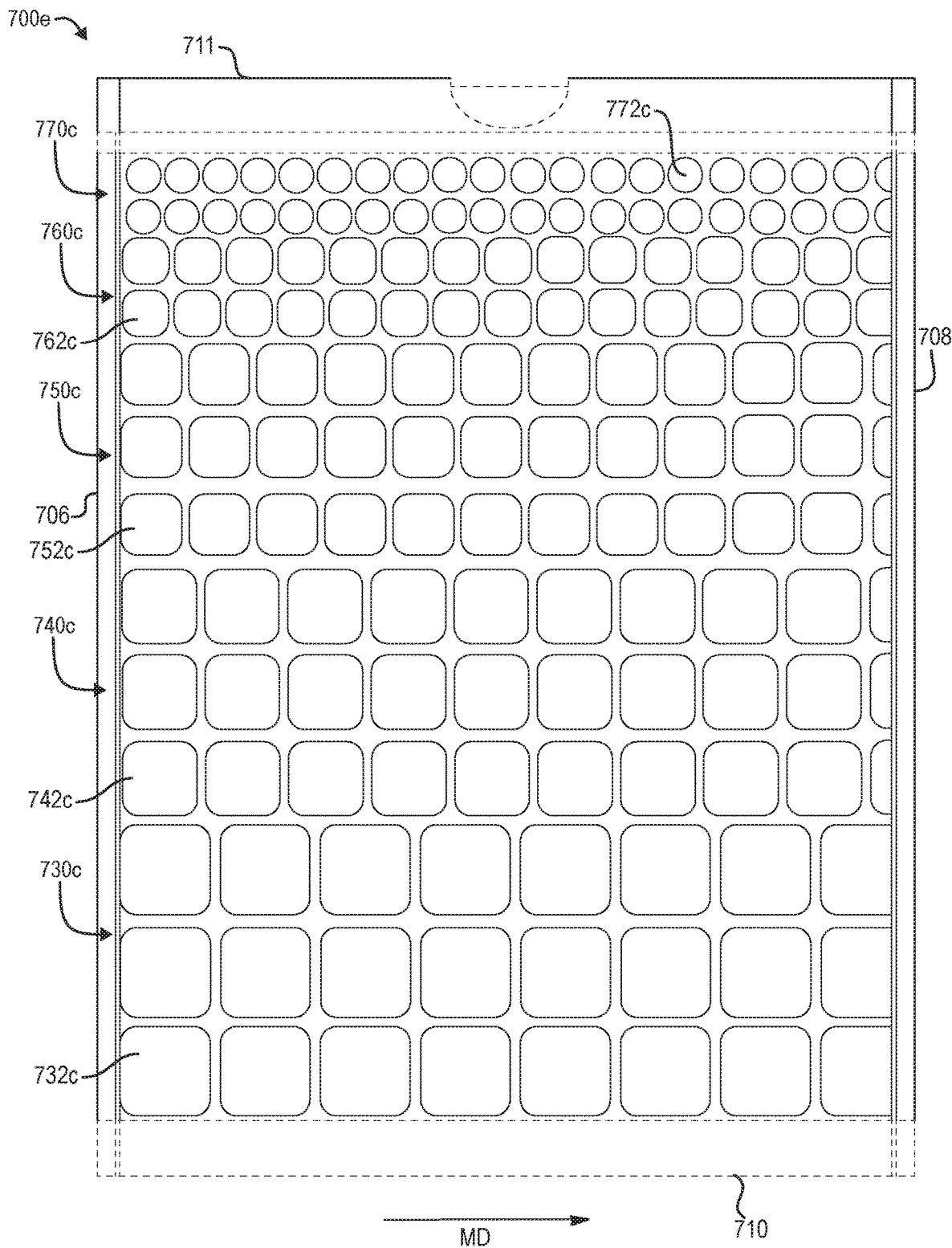
FIG. 12 shows a front view of a thermoplastic bag having deformations arranged in a gradient pattern across a height of the thermoplastic bag according to one or more implementations of the present disclosure.

As mentioned previously, one or more implementations described herein include deformation repeat units that are arranged in a gradient pattern such that the size of the deformation repeat units are one or more of progressively larger or progressively smaller along a length of the thermoplastic bag. The thermoplastic bags 700-700b shown and described above include gradient patterns of deformations with repeat units are progressively smaller from the top of the bag towards the bottom of the bag. FIG. 12 on the other hand shows a thermoplastic bag 700e, similar to the thermoplastic bags 700-700c, albeit with a gradient pattern of deformations with repeat units are progressively larger from the top of the bag towards the bottom of the bag 700e.

As shown by FIG. 12, the gradient pattern of deformations can comprise deformation repeat units 732c, 742c, 752c, 762c, 772c of differing sizes arranged so that they are progressively smaller across a height of the thermoplastic films forming the first and second side walls from the bottom edge 710 toward the top edges 711. Similar to the other bags, the deformation repeat units 732c, 742c, 752c, 762c, 772c are arranged in sections 730c, 740c, 750c, 760c and 770c.

Figure 13:
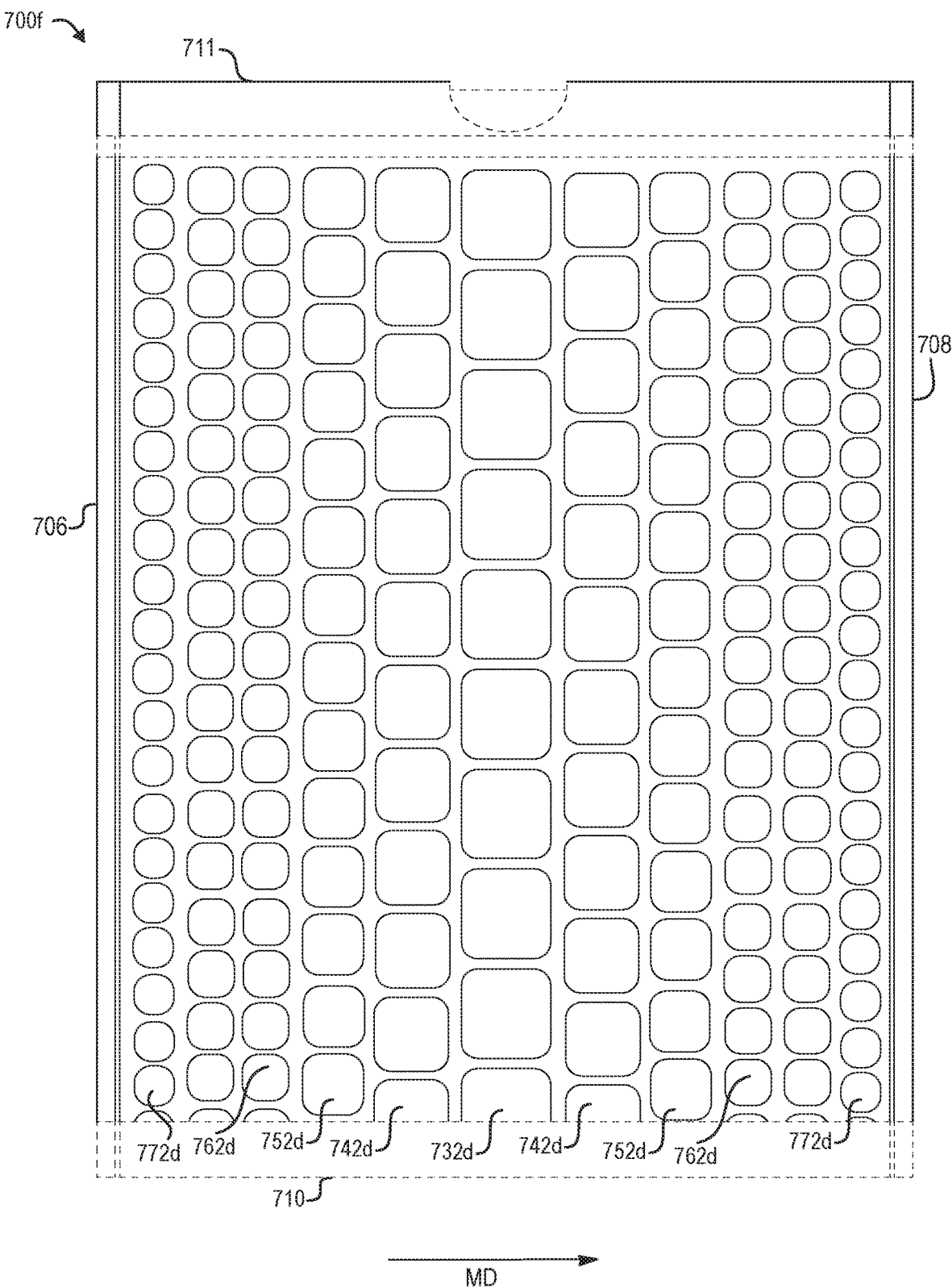
FIG. 13 shows a front view of a thermoplastic bag having deformations arranged in an increasing and then decreasing gradient pattern across a width of the thermoplastic bag according to one or more implementations of the present disclosure.

As mentioned previously, one or more implementations described herein include deformation repeat units that are arranged in a gradient pattern such that the size of the deformation repeat units are one or more of progressively larger or progressively smaller along a length of the thermoplastic bag. The thermoplastic bags 700-700b shown and described above include gradient patterns of deformations with repeat units are progressively larger or progressively smaller along a length of the thermoplastic film/bag. FIG. 13 on the other hand shows a thermoplastic bag 700f, similar to the thermoplastic bags 700-700c, albeit with a gradient pattern of deformations with repeat units are progressively larger and then progressively smaller.

As shown by FIG. 13 the gradient pattern of deformations can comprise deformation repeat units 732d, 742d, 752d, 762d, 772d of differing sizes arranged so that they are progressively larger then progressively smaller across a width of the thermoplastic films. In particular, the gradient pattern can comprise, from the first side edge 706 to the second side edge 708, deformation repeat units 772d, deformation repeat units 762d, deformation repeat units 752d, deformation repeat units 742d, deformation repeat units 732d, deformation repeat units 742d, deformation repeat units 752d, deformation repeat units 762d, and deformation repeat units 772d.

Figure 14A:
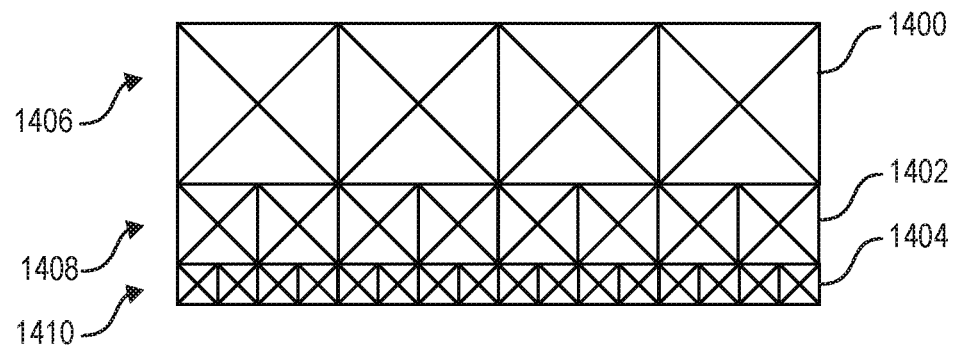
FIGS. 14A-14F shows patterns of deformation repeat units according to one or more implementations of the present disclosure.
Figure 14B:
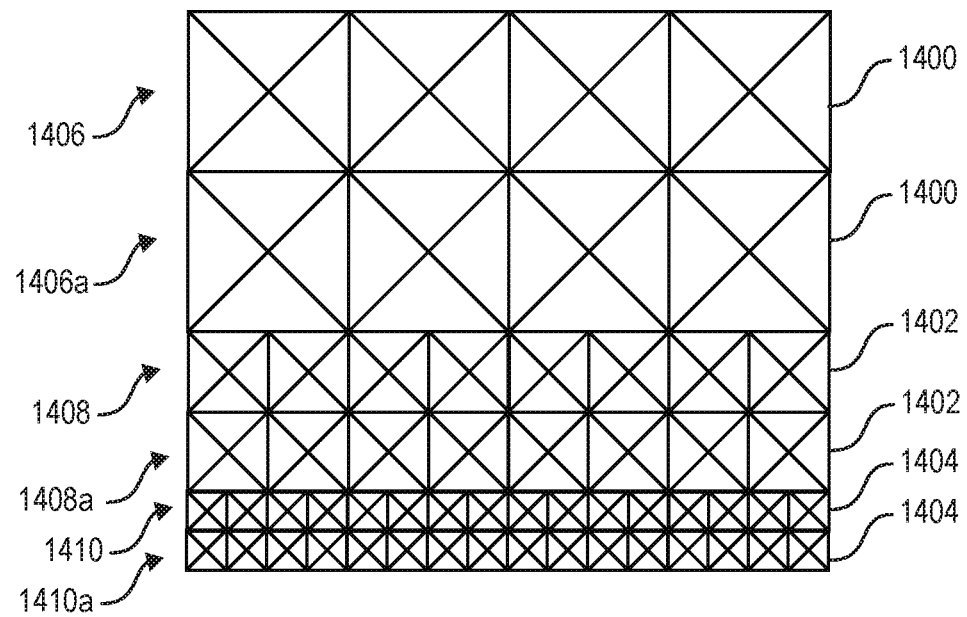

As mentioned previously, in one or more implementations, the gradient pattern can comprise multiple rows of deformation repeat units. In such implementations, there are deformation repeat units of the same size directly next to each other along the direction of the gradient. In alternative implementations, the gradient patterns can comprise single rows of deformation repeat units such that deformation repeat units of the same size are not directly next to each other along the direction of the gradient. For example, FIG. 14A illustrates deformation repeat units 1400, 1402, and 1404 each in single rows 1406, 1408, 1410, respectively. As shown, along the direction of the gradient, the dimension of the deformation repeat units change with each repeat unit. On the other hand FIG. 14B, shows an implementation where the dimensions of the deformation repeat units change with every other repeat unit. In particular, there are second rows of deformation repeat units 1406a, 1408a, 1410a.

FIGS. 14A and 14B also illustrates that the deformation repeat units 1400, 1402, and 1404 can have sizes that are directly proportional to each other. For example, deformation repeat units 1404 have a length and width that is directly half of the length and width of the deformation repeat units 1402. Similarly, deformation repeat units 1404 have a length and width that is one fourth of the length and width of the deformation repeat units 1400.

Figure 14C:
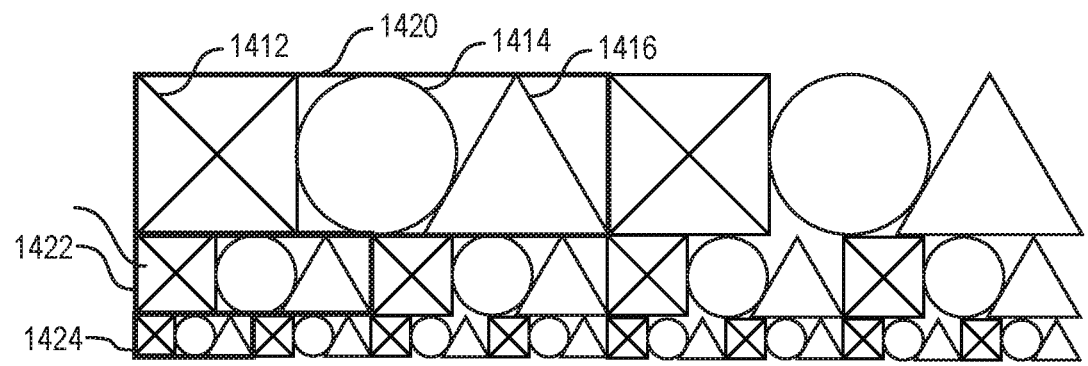

The deformation repeat units shown and described above each include a single shape. Alternative implementations can comprise deformation repeat units with multiple sub-shapes. For example, FIG. 14C illustrates deformation repeat units 1420, 1422, and 1424 that include three sub-shapes or sub-repeat units. In particular, each of the deformation repeat units 1420, 1422, and 1424 include sub-shapes or sub-repeat units 1412, 1414, 1416. More specifically, the deformation repeat units 1420, 1422, and 1424 comprise rectangles of differing sizes. Each of the deformation repeat units 1420, 1422, and 1424 includes a sub-shape square repeat unit 1412, a sub-shape circular repeat unit 1414, and a sub-shape triangle repeat unit 1416.

Figure 14D:
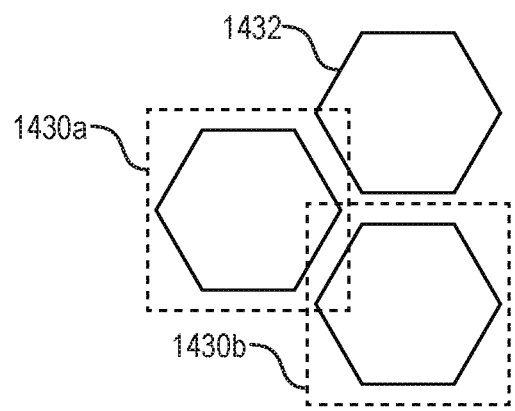

While the deformation repeat units shown in FIGS. 14A-14C are aligned in rows, in alternative implementations the deformation repeat units overlap and are otherwise not in linear rows. For example, FIG. 14D illustrates three hexagon-shaped deformation repeat units 1432 that include overlapping regions. In particular, as shown, the hexagon-shaped deformation repeat units within outer rectangular outlines 1430a, 1430b include adjacent edges where the outer rectangular outlines 1430a, 1430b overlap. While the hexagon-shaped deformation repeat units 1432 are aligned in columns, in other implementations, the deformation repeat units can be arranged so as not to be aligned in rows or columns.

Figure 14E:
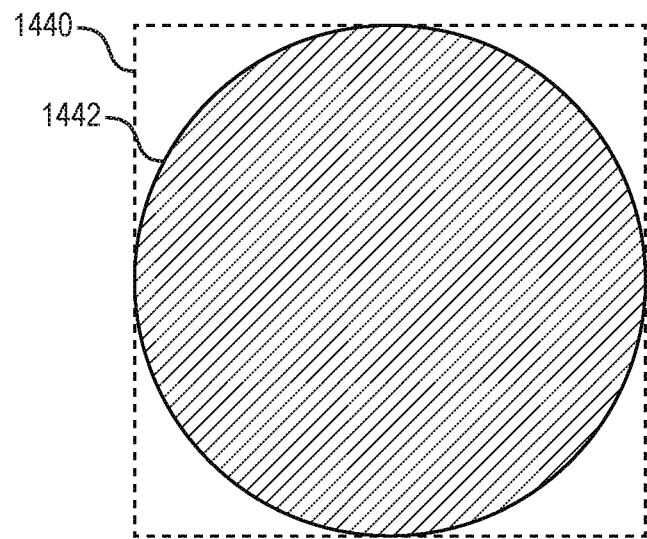
Figure 14F:
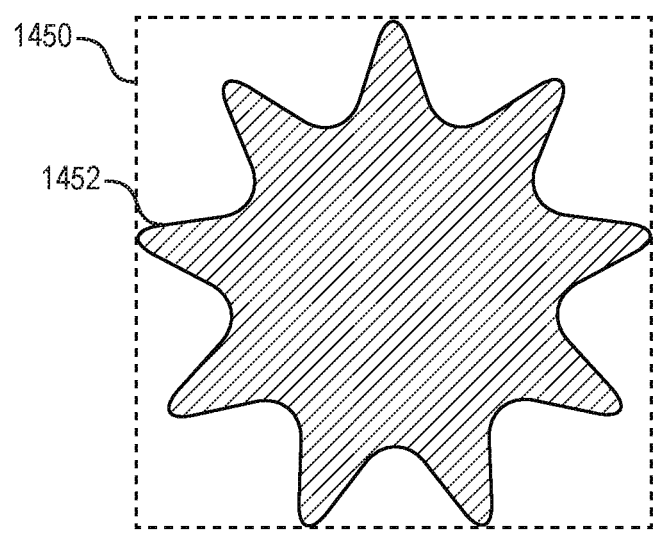

As mentioned above, the deformation repeat units can have any shape or shapes. In one or more implementations the deformation repeat units are defined by an outer rectangular outline and comprise a polygon, parabola, circle, hexagons, diamonds, stars, non-symmetric complex shapes, or other shapes. For example, FIG. 14E illustrates a deformation repeat unit 1442 having a circular shape. In particular, the deformation repeat unit 1442 comprises a plurality of diagonal protrusions with differing lengths that define a circle. FIG. 14F illustrates a deformation repeat unit 1452 having a complex shape. In particular, the deformation repeat unit 1452 comprises a plurality of diagonal protrusions with differing lengths that define a complex shape. Furthermore, the deformation repeat units 1442 and 1452 are defined by an outer rectangular outlines 1440, 1450.

In addition to the foregoing, the deformation repeat units can optionally have one or more dimensions based on one or more dimensions of a bag in which they are formed. For example, the length, width, area, and/or aspect ratio of the deformation repeat units can correspond with (i.e., be directly proportional to) the length, width, area, and/or aspect ratio of the bag in which they are formed. The correspondence between the deformation repeat units and the bag can harmonize the overall appearance of the bag. In particular, the correspondence can harmonize the appearance of bag because the resulting bag design is scalable, recognizable, and aesthetically coordinated with the deformation repeat units. Additionally, the correspondence between the deformation repeat units and the bag can harmonize the function of the bag. More particularly, the correspondence can harmonize the function of bag by providing mechanical performance based on the design, size, and frequency of the deformation repeat units within the overall bag dimensions.

Figure 15:
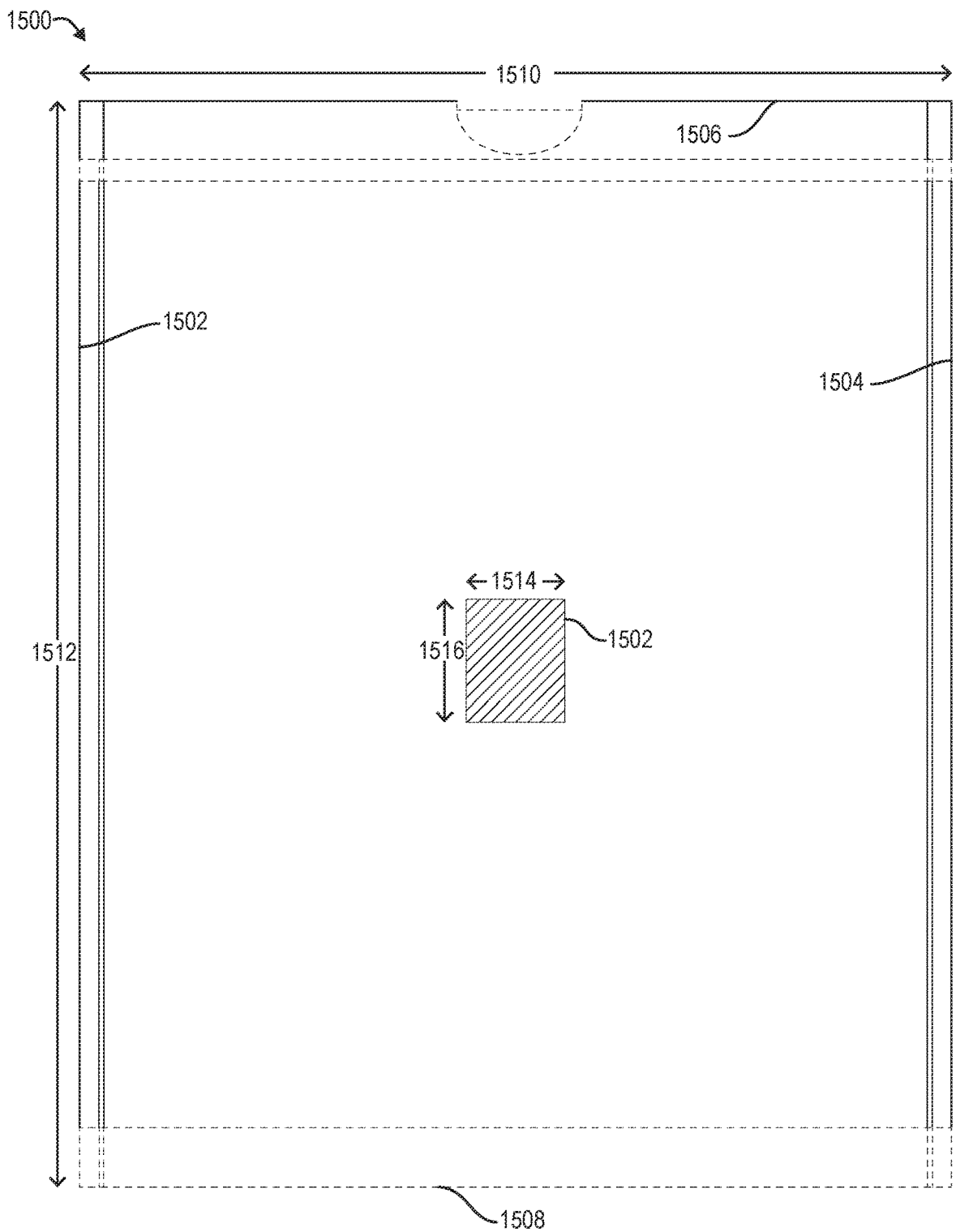
FIG. 15 shows a front view of a thermoplastic bag with deformation repeat units having an aspect ratio proportional to an aspect ratio of the thermoplastic bag according to one or more implementations of the present disclosure.

Referring now to FIG. 15, a thermoplastic bag 1500 is illustrated that includes deformation repeat units 1502 that have one or more dimensions that correspond with one or more dimensions of the thermoplastic bag 1500. FIG. 15 illustrates a single, enlarged deformation repeat unit 1502 for ease of illustration. One will appreciate that the thermoplastic bag 1500 can include a plurality of deformation repeat units 1502 that repeat across the thermoplastic bag 1500 in a pattern (e.g., a gradient pattern).

As shown by FIG. 15, the thermoplastic bag 1500 can have a first side edge 1502 and an opposing second side edge 1504. The distance between the first side edge 1502 and the second side edge 1504 can define a width 1510 of the thermoplastic bag 1500. Additionally, the thermoplastic bag 1500 includes a top edge 1506 and an opposing bottom edge 1508. The distance between the top edge 1506 and the bottom edge 1508 can define a height 1512 of the thermoplastic bag 1500. The deformation repeat unit 1502 also includes a width 1514 and a height 1516. Together the width and height of the bag can define an aspect ratio of the bag (e.g., width divided by height). Similarly the width and height of the deformation repeat unit 1502 can define an aspect ratio of the deformation repeat unit 1502. As shown by FIG. 15, the aspect ratio of the deformation repeat unit 1502 can correspond to the aspect ratio of the thermoplastic bag 1500. In other words, the ratio of the width/height of the deformation repeat unit 1502 is equal to the ratio of the width/height of the thermoplastic bag 1500.

Figure 16:
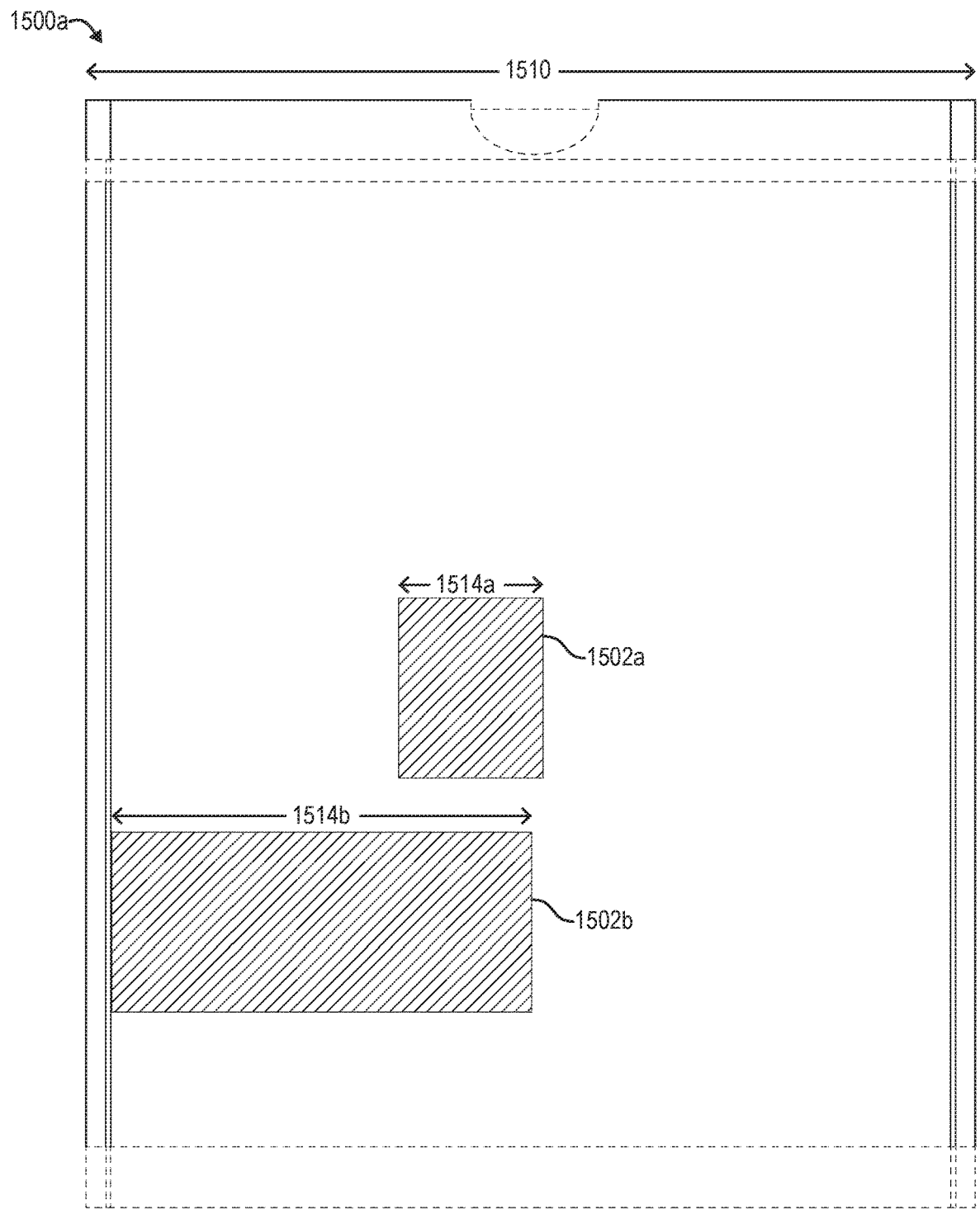
FIG. 16 shows a front view of a thermoplastic bag with deformation repeat units having a width proportional to a width of the thermoplastic bag according to one or more implementations of the present disclosure.

In alternative implementations, the width of the deformation repeat unit corresponds to the width of the thermoplastic bag while the height does not. For example, FIG. 16 illustrates a thermoplastic bag 1500a in which a deformation repeat unit 1502a has a width 1514a that corresponds to a width 1510 of the thermoplastic bag 1500a. In other words, the width 1514a of the deformation repeat unit 1502a is an exact multiple of the width 1510 of the thermoplastic bag 1500a. In particular, the width 1514a is ⅛th of the width 1510 of the thermoplastic bag 1500a. FIG. 16 further illustrates another example of a deformation repeat unit with a width that corresponds with the width 1510 of the thermoplastic bag 1500a. In particular, the deformation repeat unit 1502b has a width 1514b that is ½ of the width 1510 of the thermoplastic bag 1500a.

Figure 17:
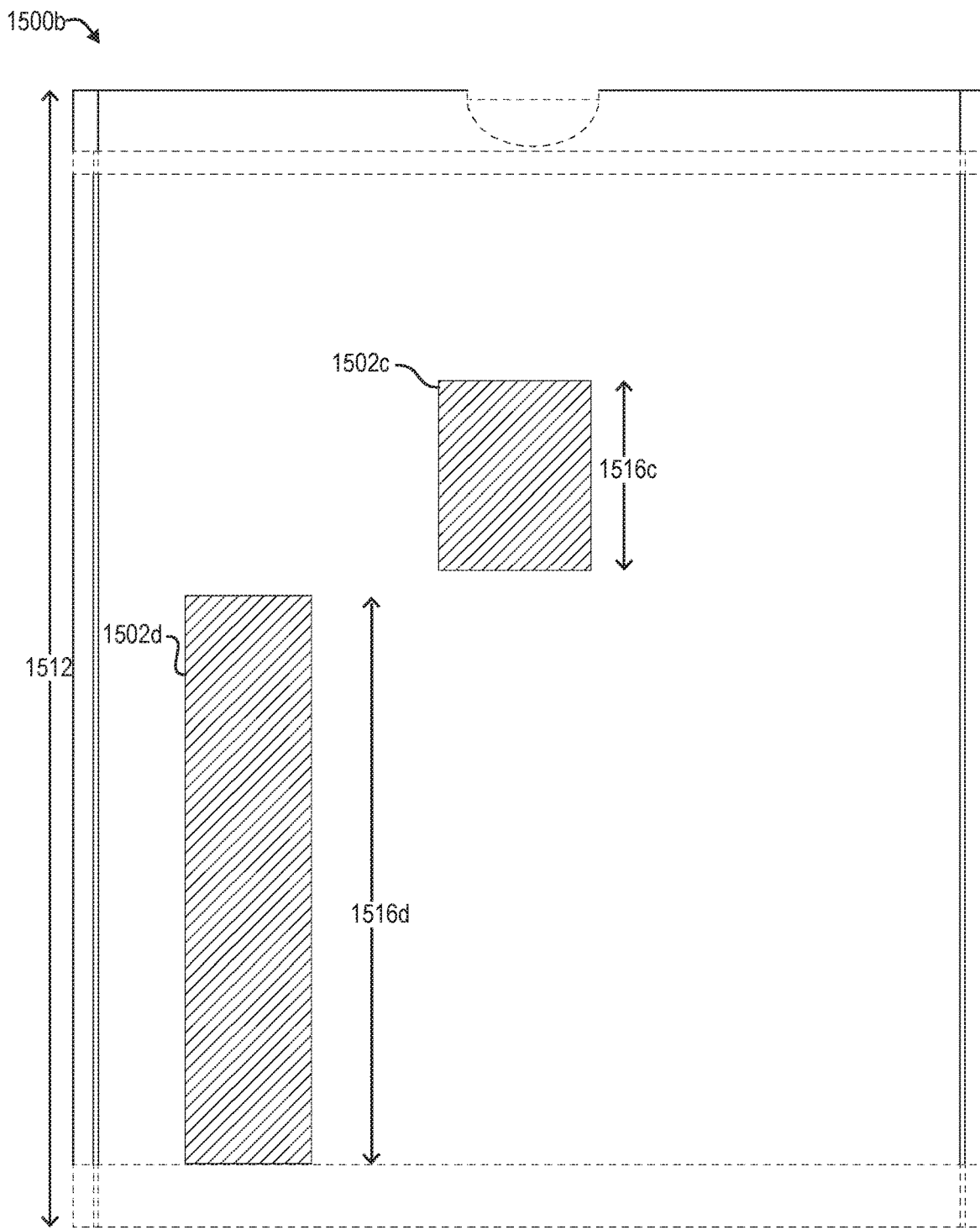
FIG. 17 shows a front view of a thermoplastic bag with deformation repeat units having a height proportional to a height of the thermoplastic bag according to one or more implementations of the present disclosure.

In alternative implementations the height of the deformation repeat unit corresponds to the height of the thermoplastic bag while the width does not. For example, FIG. 17 illustrates a thermoplastic bag 1500b in which a deformation repeat unit 1502c has a height 1516c that corresponds to a height 1512 of the thermoplastic bag 1500b. In other words, the height 1516c of the deformation repeat unit 1502c is an exact multiple of the height 1512 of the thermoplastic bag 1500b. In particular, the height 1516c is ⅛th of the height 1512 of the thermoplastic bag 1500b. FIG. 17 further illustrates another example of a deformation repeat unit 1502d with a height that corresponds with the height 1512 of the thermoplastic bag 1500b. In particular, the deformation repeat unit 1502d has a height 1516d that is ½ of the height 1512 of the thermoplastic bag 1500b.

Figure 18:
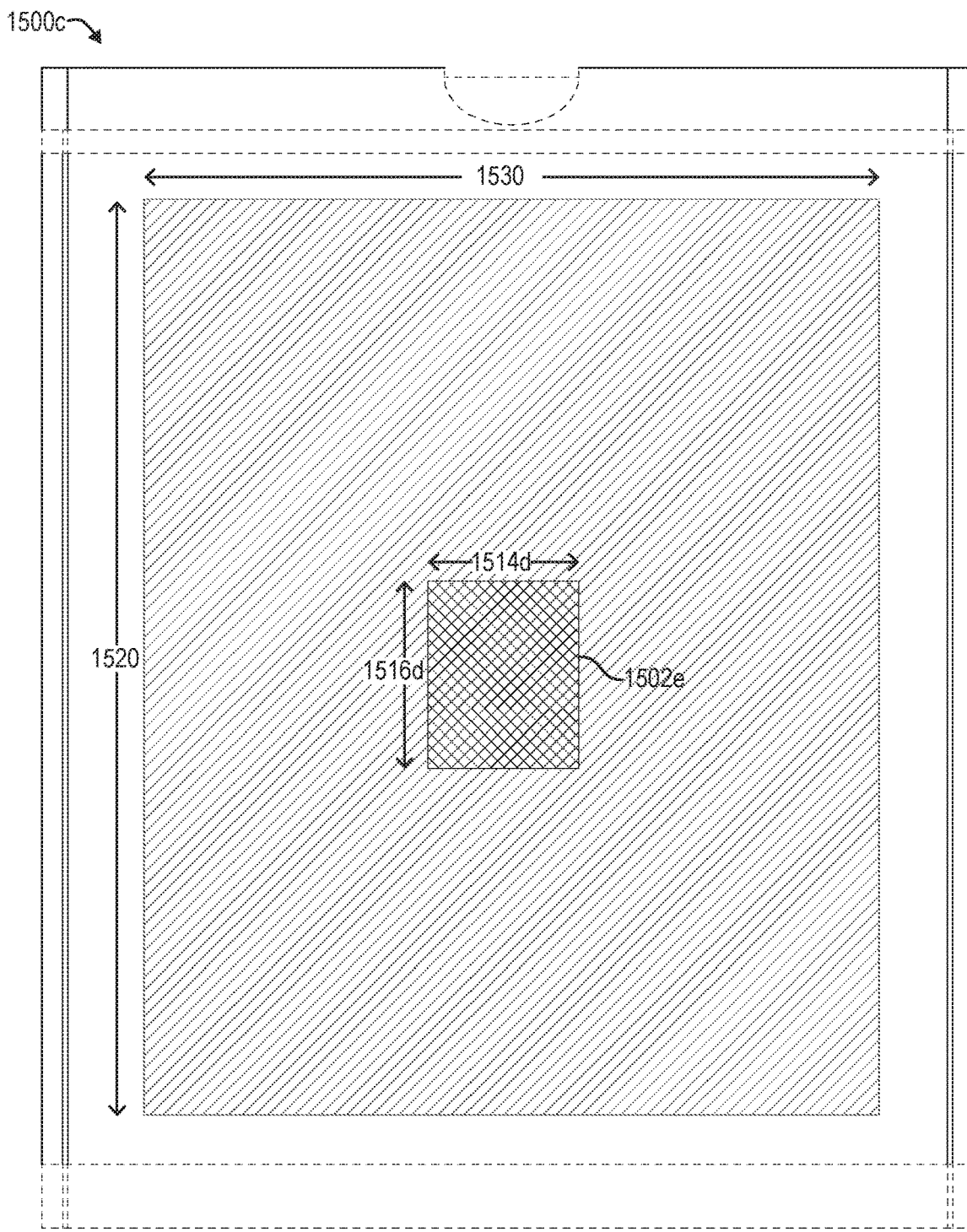
FIG. 18 shows a front view of a thermoplastic bag with deformation repeat units having an aspect ratio proportional to an aspect ratio of a deformation area of the thermoplastic bag according to one or more implementations of the present disclosure.

In addition to the foregoing, the deformation repeat units can optionally have one or more dimensions based on one or more dimensions of a deformation area of a thermoplastic bag. For example, the length, width, area, and/or aspect ratio of the deformation repeat units can correspond with the length, width, area, and/or aspect ratio of a deformation area of a bag in which they are formed. For example, FIG. 18 illustrates a thermoplastic bag 1500c that includes a deformation area (i.e., an area in which the deformations are contained and is defined by the deformations) that has a height 1520 and a width 1530. The thermoplastic bag 1500c also includes deformation repeat units 1502e with a width

1514*d* and a height 1516*d*. As shown by FIG. 18, the aspect ratio of the deformation repeat unit 1502*e* can correspond to the aspect ratio of the deformation area. In other words, the ratio of the width/height of the deformation repeat unit 1502*e* is equal to the ratio of the width/height of the deformation area of the thermoplastic bag 1500*c*.

Figure 19:
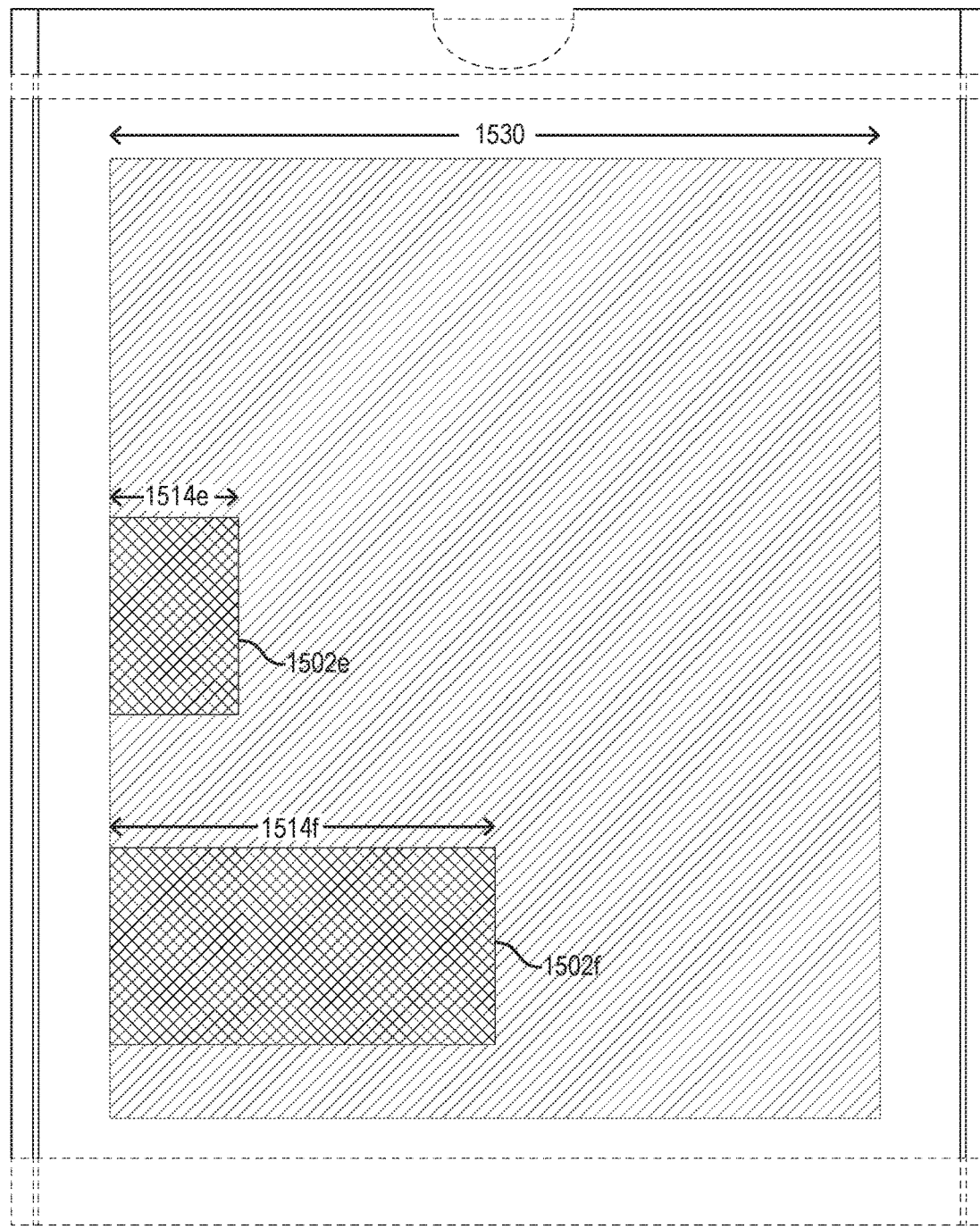
FIG. 19 shows a front view of a thermoplastic bag with deformation repeat units having a width proportional to a width of a deformation area of the thermoplastic bag according to one or more implementations of the present disclosure.

In alternative implementations, the width of the deformation repeat unit corresponds to the width of the deformation area while the height does not. For example, FIG. 19 illustrates a thermoplastic bag 1500*d* in which a deformation repeat unit 1502*e* has a width 1514*e* that corresponds to a width 1530 of the deformation area of the thermoplastic bag 1500*d*. In other words, the width 1514*e* of the deformation repeat unit 1502*e* is an exact multiple of the width 1530 of the deformation area. In particular, the width 1514*e* is ⅙th of the width 1530 of the deformation area. FIG. 19 further illustrates another example of a deformation repeat unit with a width that corresponds with the width 1530 of the deformation area. In particular, the deformation repeat unit 1502*f* has a width 1514*f* that is ½ of the width 1530 of the deformation area.

Figure 20:
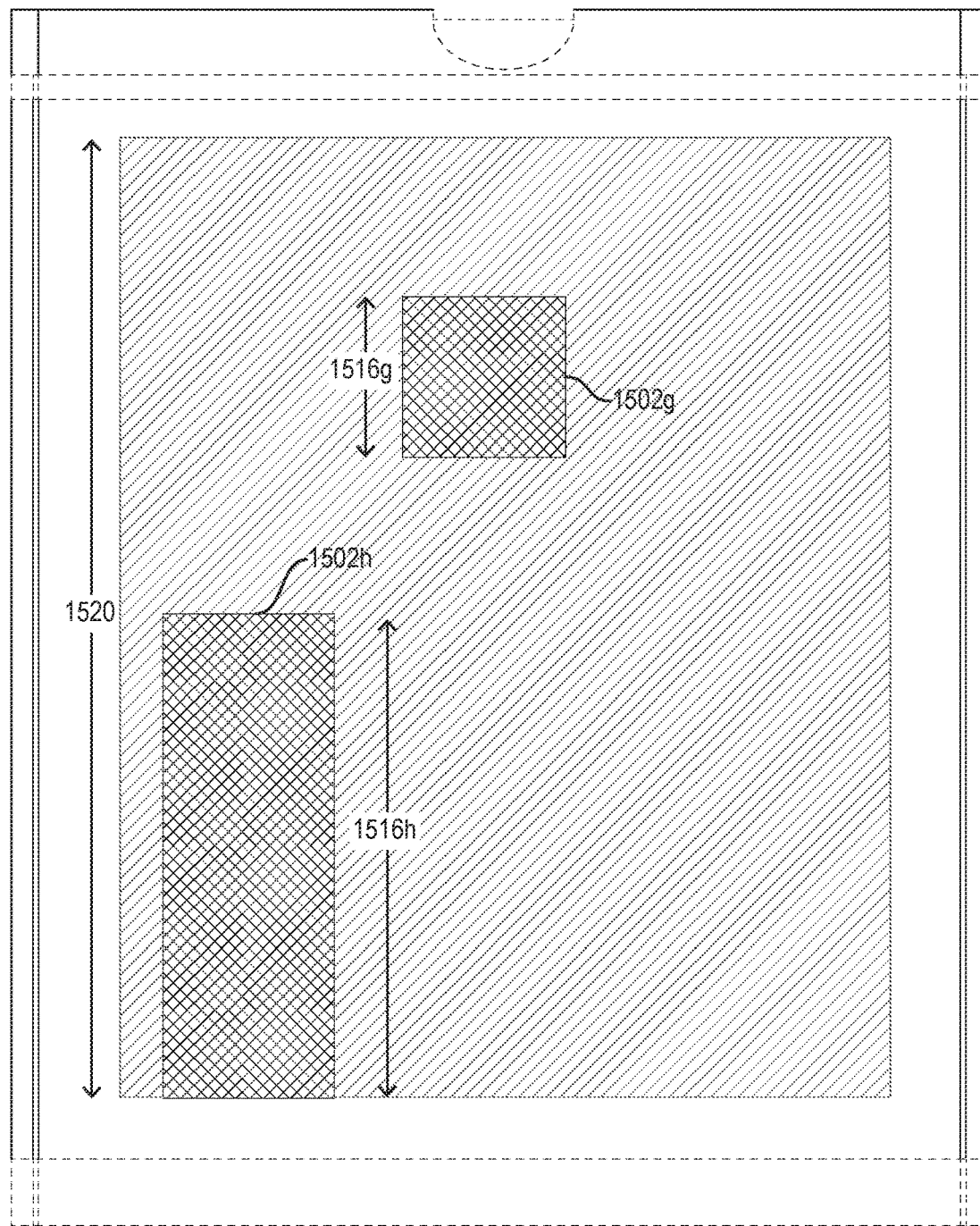
FIG. 20 shows a front view of a thermoplastic bag with deformation repeat units having a height proportional to a height of a deformation area of the thermoplastic bag according to one or more implementations of the present disclosure.

In alternative implementations the height of the deformation repeat unit corresponds to the height of the deformation area while the width does not. For example, FIG. 20 illustrates a thermoplastic bag 1500*e* in which a deformation repeat unit 1502*g* has a height 1516*g* that corresponds to a height 1520 of the deformation area of the thermoplastic bag 1500*e*. In other words, the height 1516*g* of the deformation repeat unit 1502*g* is an exact multiple of the height 1520 of the deformation area. In particular, the height 1516*g* is ⅙th of the height 1520 of the thermoplastic bag 1500*e*. FIG. 20 further illustrates another example of a deformation repeat unit 1502*h* with a height that corresponds with the height 1520 of the deformation area. In particular, the deformation repeat unit 1502*h* has a height 1516*h* that is ½ of the height 1520 of the deformation area of the thermoplastic bag 1500*e*.

Figure 21:
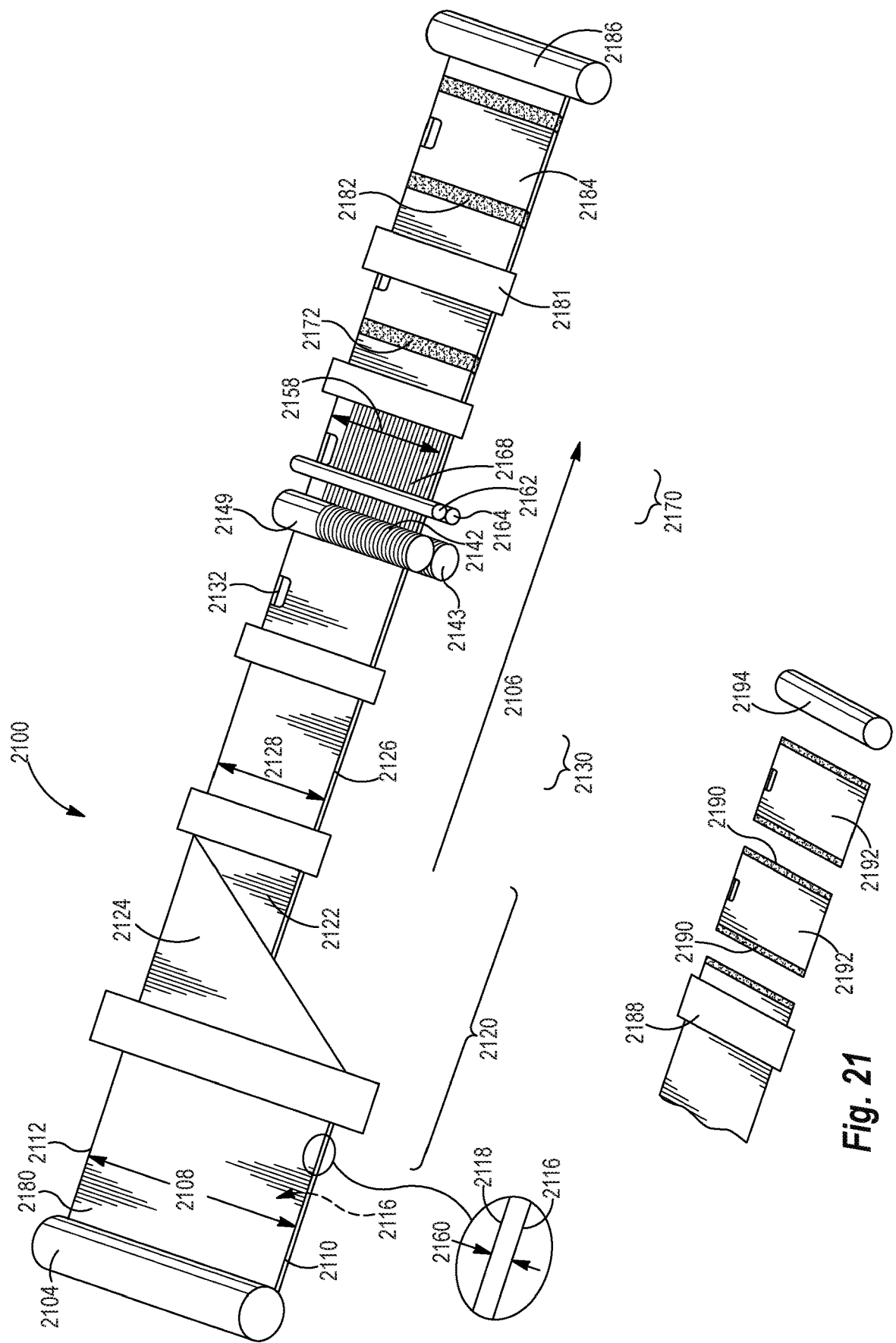
FIG. 21 illustrates a schematic diagram of a process for manufacturing thermoplastic bags with deformations arranged in gradient patterns in accordance with one or more implementations of the present disclosure.

To produce a bag having a gradient pattern of deformations as described, continuous webs of thermoplastic material may be processed through a high-speed manufacturing environment such as that illustrated in FIG. 21. In the illustrated process 2100, production may begin by unwinding a first continuous web or film 2180 of thermoplastic sheet material from a roll 2104 and advancing the web along a machine direction 2106. The unwound web 2180 may have a width 2108 that may be perpendicular to the machine direction 2106, as measured between a first edge 2110 and an opposite second edge 2112. The unwound web 2180 may have an initial average thickness 2160 measured between a first surface 2116 and a second surface 2118. In other manufacturing environments, the web 2180 may be provided in other forms or even extruded directly from a thermoplastic forming process. To provide the first and second sidewalls of the finished bag, the web 2180 may be folded into a first half 2122 and an opposing second half 2124 about the machine direction 2106 by a folding operation 2120. When so folded, the first edge 2110 may be moved adjacent to the second edge 2112 of the web. Accordingly, the width of the web 2180 proceeding in the machine direction 2106 after the folding operation 2120 may be a width 2128 that may be half the initial width 2108. As may be appreciated, the portion mid-width of the unwound web 2180 may become the outer edge 2126 of the folded web. In any event, the hems may be formed along the adjacent first and second edges 2110, 2112 and a draw tape 2132 may be inserted during a hem and draw tape operation 2130.

To form a gradient pattern of deformations 2168, the processing equipment may include ring rolling, SELF'ing or embossing intermeshing rollers 2142, 2143 such as those described herein above. Referring to FIG. 21, the folded web 2180 may be advanced along the machine direction 2106 between the intermeshing rollers 2142, 2143, which may be set into rotation in opposite rotational directions to impart the resulting pattern 2168. To facilitate patterning of the web 2180, the first roller 2142 and second roller 2143 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the pattern 2168 intermeshing rollers 2142, 2143 may be arranged so that they are co-extensive with or wider than the width 2108 of the folded web 2180. In one or more implementations, the pattern 2168 intermeshing rollers 2142, 2143 may extend from proximate the folded edge 2126 to the adjacent edges 2110, 2112. To avert imparting the pattern 2168 onto the portion of the web that includes the draw tape 2132, the corresponding ends 2149 of the rollers 2142, 2143 may be smooth and without the ridges and grooves. Thus, the adjacent edges 2110, 2112 and the corresponding portion of the web proximate those edges that pass between the smooth ends 2149 of the rollers 2142, 2143 may not be imparted with the pattern 2168. While FIG. 21 illustrates a single pair of intermeshing rollers, one or more implementations can include multiple pairs of intermeshing rollers so as to be able to produce a desired number of patterns of deformations.

The processing equipment may include pinch rollers 2162, 2164 to accommodate the width 2158 of the web 2180. To produce the finished bag, the processing equipment may further process the folded web with the pattern. For example, to form the parallel side edges of the finished bag, the web may proceed through a sealing operation 2170 in which heat seals 2172 may be formed between the folded edge 2126 and the adjacent edges 2110, 2112. The heat seals may fuse together the adjacent halves 2122, 2124 of the folded web. The heat seals 2172 may be spaced apart along the folded web and in conjunction with the folded outer edge 2126 may define individual bags. The heat seals may be made with a heating device, such as, a heated knife. A perforating operation 2181 may perforate 2182 the heat seals 2172 with a perforating device, such as, a perforating knife so that individual bags 2184 may be separated from the web. In one or more implementations, the webs may be folded one or more times before the folded webs may be directed through the perforating operation. The web 2180 embodying the bags 2184 may be wound into a roll 2186 for packaging and distribution. For example, the roll 2186 may be placed in a box or a bag for sale to a customer.

In one or more implementations of the process, a cutting operation 2188 may replace the perforating operation 2181. The web is directed through a cutting operation 2188 which cuts the webs at location 2190 into individual bags 2192 prior to winding onto a roll 2194 for packaging and distribution. For example, the roll 2194 may be placed in a box or bag for sale to a customer. The bags may be interleaved prior to winding into the roll 2194. In one or more implementations, the web may be folded one or more times before the folded web is cut into individual bags. In one or more implementations, the bags 2192 may be positioned in a box or bag, and not onto the roll 2194.

Figure 22:
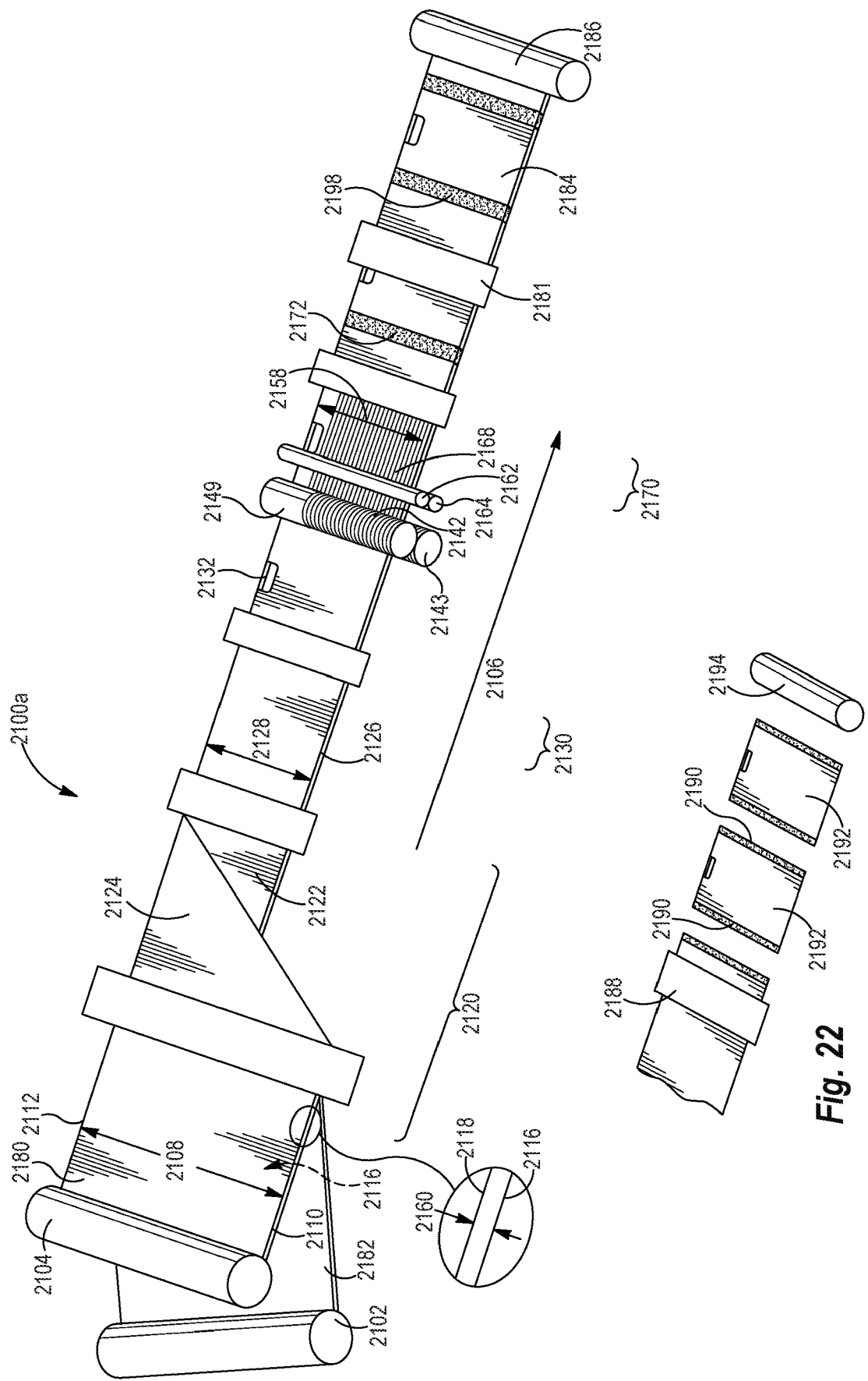
FIG. 22 illustrates a schematic diagram of a process for manufacturing thermoplastic bags with deformations arranged in gradient patterns in accordance with one or more implementations of the present disclosure.

FIG. 22 illustrates a modified high-speed manufacturing 2100*a* that involves unwinding a second continuous web or film 2182 of thermoplastic sheet material from a roll 2102 and advancing the web along a machine direction 2106. The second film 2182 can comprise a thermoplastic material, a width, and/or a thickness that is similar or the same as the first film 2180. In alternative one or more implementations, one or more of the thermoplastic material, width, and/or thickness of the second film 2182 can differ from that of the first film 2180. The films 2180, 2182 can be folded together during the folding operation 2120 such that they pass through the intermeshing rollers 2142, 2143 together to form the pattern and resulting multi-layered bags.

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A thermoplastic bag comprising post-formation deformations, the thermoplastic bag comprising:
   a first sidewall and a second sidewall joined together along a first side edge, a second side edge, and a bottom edge;
   an opening opposite the bottom edge; and
   a plurality of deformation repeat units formed in the first sidewall and the second sidewall, wherein each of the plurality of deformation repeat units comprises a grouping of deformations forming a shape, wherein the plurality of deformation repeat units is arranged in a gradient pattern such that a size of the deformation repeat units progressively increases from a bottom of the thermoplastic bag to a top of the thermoplastic bag.

2. The thermoplastic bag of claim 1, wherein each of the plurality of deformation repeat units comprises one or more of a width that is proportional to a width of the thermoplastic bag, a height that is proportional to a height of the thermoplastic bag, or an aspect ratio that is proportional to an aspect ratio of the thermoplastic bag.

3. The thermoplastic bag of claim 1, wherein the deformations are contained within a deformation area of the first and second sidewalls, wherein the deformation area comprises one or more of a width that is proportional to a width of the thermoplastic bag, a height that is proportional to a height of the thermoplastic bag, or an aspect ratio that is proportional to an aspect ratio of the thermoplastic bag.

4. The thermoplastic bag of claim 1, wherein the first and second sidewalls each comprise an inner thermoplastic film incrementally secured to an outer thermoplastic film by a plurality of bonds.

5. The thermoplastic bag of claim 4, wherein the plurality of bonds are aligned with the deformations.

6. The thermoplastic bag of claim 4, wherein the inner thermoplastic film is white and the outer thermoplastic film is a light non-white color.

7. The thermoplastic bag of claim 1, wherein the plurality of deformation repeat units is arranged in the first sidewall and the second sidewall such that the deformation repeat units are one or more of progressively larger or progressively smaller along a width of the thermoplastic bag.

8. The thermoplastic bag of claim 1, wherein the plurality of deformation repeat units is arranged in the first sidewall and the second sidewall such that the deformation repeat units are one or more of progressively larger or progressively smaller along a height of the thermoplastic bag.

9. The thermoplastic bag of claim 8, wherein the plurality of deformation repeat units is arranged in the first sidewall and the second sidewall such that the deformation repeat units maintain a consistent size along a width of the thermoplastic bag.

10. The thermoplastic bag of claim 8, wherein the plurality of deformation repeat units is arranged in the first sidewall and the second sidewall such that the gradient pattern comprises multiples rows of first deformation repeat units of a first size adjacent to multiple rows of second deformation repeat units of a second size which are adjacent to multiple rows of third deformation repeat units of a third size.

11. The thermoplastic bag of claim 10, wherein:
    the plurality of deformation repeat units comprises SELF-ing deformations; and
    the multiples rows of the first deformation repeat units provide a first portion of the thermoplastic bag with greater elasticity than second and third portions of the thermoplastic bag respectively including the multiple rows of the second deformation repeat units and the multiple rows of the third deformation repeat units.

12. A thermoplastic bag comprising post-formation deformations, the thermoplastic bag comprising:
    a first sidewall and a second sidewall joined together along a first side edge, a second side edge, and a bottom edge;
    an opening opposite the bottom edge; and
    a plurality of deformation repeat units formed in the first sidewall and the second sidewall, wherein each of the plurality of deformation repeat units comprises a grouping of deformations forming a shape, wherein the plurality of deformation repeat units is arranged in a gradient pattern such that a size of the deformation repeat units progressively decreases from a bottom of the thermoplastic bag to a top of the thermoplastic bag.

13. The thermoplastic bag of claim 12, wherein each of the plurality of deformation repeat units comprises an aspect ratio that is proportional to an aspect ratio of the thermoplastic bag.

14. The thermoplastic bag of claim 12, wherein the first and second sidewalls each comprise an inner thermoplastic film incrementally secured to an outer thermoplastic film by a plurality of bonds.

15. The thermoplastic bag of claim 14, wherein the plurality of bonds are aligned with the deformations.

16. A thermoplastic bag comprising post-formation deformations, the thermoplastic bag comprising:
    a first sidewall and a second sidewall joined together along a first side edge, a second side edge, and a bottom edge;
    an opening opposite the bottom edge;
    a plurality of first deformation repeat units formed in the first sidewall and the second sidewall, each of the plurality of first deformation repeat units comprising a grouping of deformations forming a first shape comprising a first size;

a plurality of second deformation repeat units formed in the first sidewall and the second sidewall, each of the plurality of second deformation repeat units comprising a grouping of deformations forming a second shape comprising a second size, the second size being smaller than the first size; and a plurality of third deformation repeat units formed in the first sidewall and the second sidewall, each of the plurality of third deformation repeat units comprising a grouping of deformations forming a third shape comprising a third size, the third size being smaller than the second size;

wherein the plurality of first deformation repeat units, the plurality of second deformation repeat units, and the plurality of third deformation repeat units are arranged in a gradient pattern such that the first size, the second size, and the third size progressively increase or progressively decrease from a bottom of the thermoplastic bag to a top of the thermoplastic bag.

17. The thermoplastic bag of claim 16, wherein the plurality of first deformation repeat units, the plurality of second deformation repeat units, and the plurality of third deformation repeat units are arranged in the first sidewall and the second sidewall such that the first size, the second size, and the third size vary along a width of the thermoplastic bag.

18. The thermoplastic bag of claim 16, wherein the plurality of first deformation repeat units, the plurality of second deformation repeat units, and the plurality of third deformation repeat units are arranged in the first sidewall and the second sidewall such that the plurality of first deformation repeat units, the plurality of second deformation repeat units, and the plurality of third deformation repeat units each maintain a consistent size along a width of the thermoplastic bag.

19. The thermoplastic bag of claim 16, wherein the plurality of first deformation repeat units, the plurality of second deformation repeat units, and the plurality of third deformation repeat units are arranged in the first sidewall and the second sidewall such that the gradient pattern comprises multiples rows of first deformation repeat units of the first size adjacent to multiple rows of second deformation repeat units of the second size which are adjacent to multiple rows of third deformation repeat units of the third size.

20. The thermoplastic bag of claim 19, wherein:
the plurality of first deformation repeat units, the plurality of second deformation repeat units, and the plurality of third deformation repeat units comprise SELFing deformations; and
the multiples rows of the first deformation repeat units provide a first portion of the thermoplastic bag with greater elasticity than second and third portions of the thermoplastic bag respectively including the multiple rows of the second deformation repeat units and the multiple rows of the third deformation repeat units.

* * * * *